United States Patent
Liou et al.

(10) Patent No.: US 10,863,537 B2
(45) Date of Patent: Dec. 8, 2020

(54) METHOD AND APPARATUS FOR BEAM INDICATION CONSIDERING CROSS CARRIER SCHEDULING IN A WIRELESS COMMUNICATION SYSTEM

(71) Applicant: ASUSTek Computer Inc., Taipei (TW)

(72) Inventors: Jia-Hong Liou, Taipei (TW); Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/364,914

(22) Filed: Mar. 26, 2019

(65) Prior Publication Data
US 2019/0297640 A1    Sep. 26, 2019

Related U.S. Application Data

(60) Provisional application No. 62/648,076, filed on Mar. 26, 2018.

(51) Int. Cl.
*H04W 48/12* (2009.01)
*H04W 72/04* (2009.01)
(Continued)

(52) U.S. Cl.
CPC .......... *H04W 72/1289* (2013.01); *H04L 5/00* (2013.01); *H04W 16/14* (2013.01); *H04W 16/32* (2013.01);
(Continued)

(58) Field of Classification Search
CPC  H04W 74/085; H04W 72/042; H04L 5/0007; H04L 27/2602
See application file for complete search history.

(56) References Cited

U.S. PATENT DOCUMENTS

2016/0338023 A1   11/2016  Nogami
2018/0152954 A1   5/2018   Golitschek Edler Von Elbwart
(Continued)

FOREIGN PATENT DOCUMENTS

WO   2016077353   5/2016
WO   2017079560   5/2017

OTHER PUBLICATIONS

3rd Generation Partnership Project, Technical Specification Group Radio Access Network; NR; Physical layer procedures for control (Release 15), 3GPP TS 38.213 v15.0.0, (Feb. 2018), R1-1801293.
(Continued)

*Primary Examiner* — Iqbal Zaidi
(74) *Attorney, Agent, or Firm* — Skaar Ulbrich Macari, P.A.

(57) ABSTRACT

A method and apparatus are disclosed from the perspective of a network. In one embodiment, the method includes the network configuring a first serving cell and a second serving cell to a UE, wherein a first PDCCH scheduling a first PDSCH on the first serving cell and a second PDCCH scheduling a second PDSCH on the second serving cell are transmitted via a CORESET of the second serving cell. The method further includes the network not configuring a CORESET configuration for the first serving cell. Furthermore, the method includes the network indicating the UE to receive and/or monitor the first PDCCH based on CORESET configuration of the second serving cell.

17 Claims, 14 Drawing Sheets

(51) Int. Cl.
*H04L 5/00* (2006.01)
*H04W 72/12* (2009.01)
*H04W 16/14* (2009.01)
*H04W 16/32* (2009.01)

(52) U.S. Cl.
CPC ......... *H04W 48/12* (2013.01); *H04W 72/042* (2013.01); *H04W 72/1215* (2013.01)

(56) References Cited

U.S. PATENT DOCUMENTS

| 2018/0270851 | A1 | 9/2018 | Bhattad |
| 2018/0343653 | A1 | 11/2018 | Guo |
| 2019/0150183 | A1* | 5/2019 | Aiba ..................... H04W 24/10 370/336 |
| 2019/0253986 | A1* | 8/2019 | Jeon ...................... H04W 76/19 |
| 2020/0092946 | A1* | 3/2020 | Xiong ................... H04L 1/0071 |

OTHER PUBLICATIONS

3GPP TSG RAN WG1 Meeting AH 1801, R1-1800185, "Remaining issues and text proposals on beam measurement and reporting", Vancouver, Canada, Jan. 22nd-26th, 2018.

3GPP TSG RAN WG1 Meeting #92, R1-1801622, "Search space design and related issues", Athens, Greece, Feb. 26th-Mar. 2nd, 2018.

European Search Report from corresponding EP Application No. 19165118.1, dated Jul. 16, 2019.

* cited by examiner

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

METHOD AND APPARATUS FOR BEAM INDICATION CONSIDERING CROSS CARRIER SCHEDULING IN A WIRELESS COMMUNICATION SYSTEM

CROSS-REFERENCE TO RELATED APPLICATIONS

The present application claims the benefit of U.S. Provisional Patent Application Ser. No. 62/648,076 filed on Mar. 26, 2018, the entire disclosure of which is incorporated herein in its entirety by reference.

FIELD

This disclosure generally relates to wireless communication networks, and more particularly, to a method and apparatus for beam indication considering cross carrier scheduling in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network. In one embodiment, the method includes the network configuring a first serving cell and a second serving cell to a UE (User Equipment), wherein a first PDCCH (Physical Downlink Control Channel) scheduling a first PDSCH (Physical Downlink Shared Channel) on the first serving cell and a second PDCCH scheduling a second PDSCH on the second serving cell are transmitted via a CORESET (Control Resource Set) of the second serving cell. The method further includes the network not configuring a CORESET configuration for the first serving cell. Furthermore, the method includes the network indicating the UE to receive and/or monitor the first PDCCH based on CORESET configuration of the second serving cell.

BRIEF DESCRIPTION OF THE DRAWINGS

FIG. 5 is a reproduction of Table 7.3.1-1 of 3GPP TS 38.212.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R1-1801292 3GPP TS 38.212 V15.01.0 (2018-02), "NR; Multiplexing and channel coding (Release 15)"; R1-1801294 3GPP TS 38.214 V15.01.0 (2018-02), "NR; Physical layer procedures for data (Release 15)"; Final Report of 3GPP TSG RAN WG1 #86 v1.0.0 (Gothenburg, Sweden, 22-26 Aug. 2016); Final Report of 3GPP TSG RAN WG1 #86 bis v1.0.0 (Lisbon, Portugal, 10-14 Oct. 2016); Final Report of 3GPP TSG RAN WG1 #87 v1.0.0 (Reno, USA, 14-18 Nov. 2016); Final Report of 3GPP TSG RAN WG1 # AH1_NR v1.0.0 (Spokane, USA, 16-20 Jan. 2017); Final Report of 3GPP TSG RAN WG1 #88 v1.0.0 (Athens, Greece, 13-17 Feb. 2017); Final Report of 3GPP TSG RAN WG1 #89 v1.0.0 (Hangzhou, China, 15-19 May 2017); Final Report of 3GPP TSG RAN WG1 # AH_NR3 v1.0.0 (Nagoya, Japan, 18-21 Sep. 2017); Final Report of 3GPP TSG RAN WG1 #90 bis v1.0.0 (Prague, Czech Rep, 9-13 Oct. 2017); and Final Chairman's Note of 3GPP TSG RAN WG1 Meeting #91 (Reno, USA, 27 Nov.-1 Dec. 2017) (updated with email approvals). The standards and documents listed above are hereby expressly incorporated by reference in their entirety.

Figure 1:
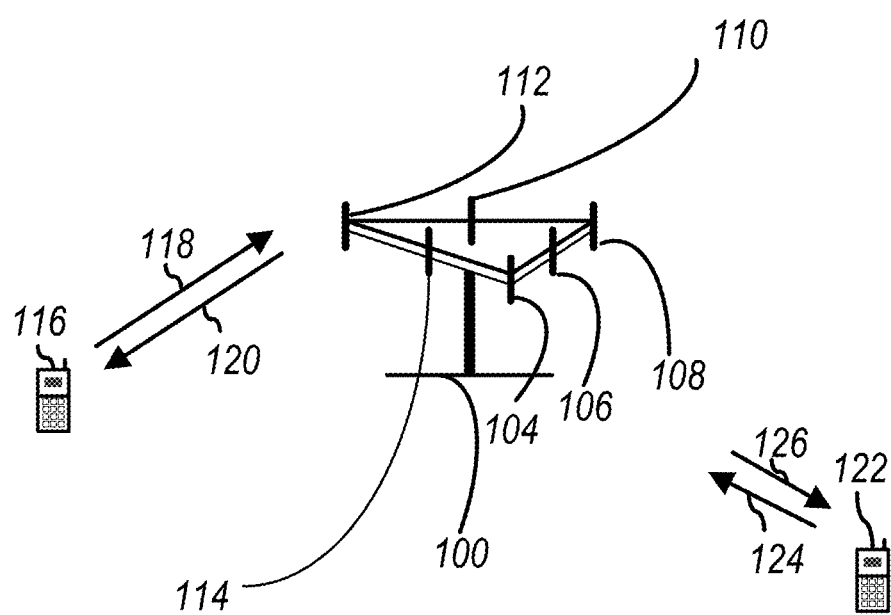
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as a network, an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
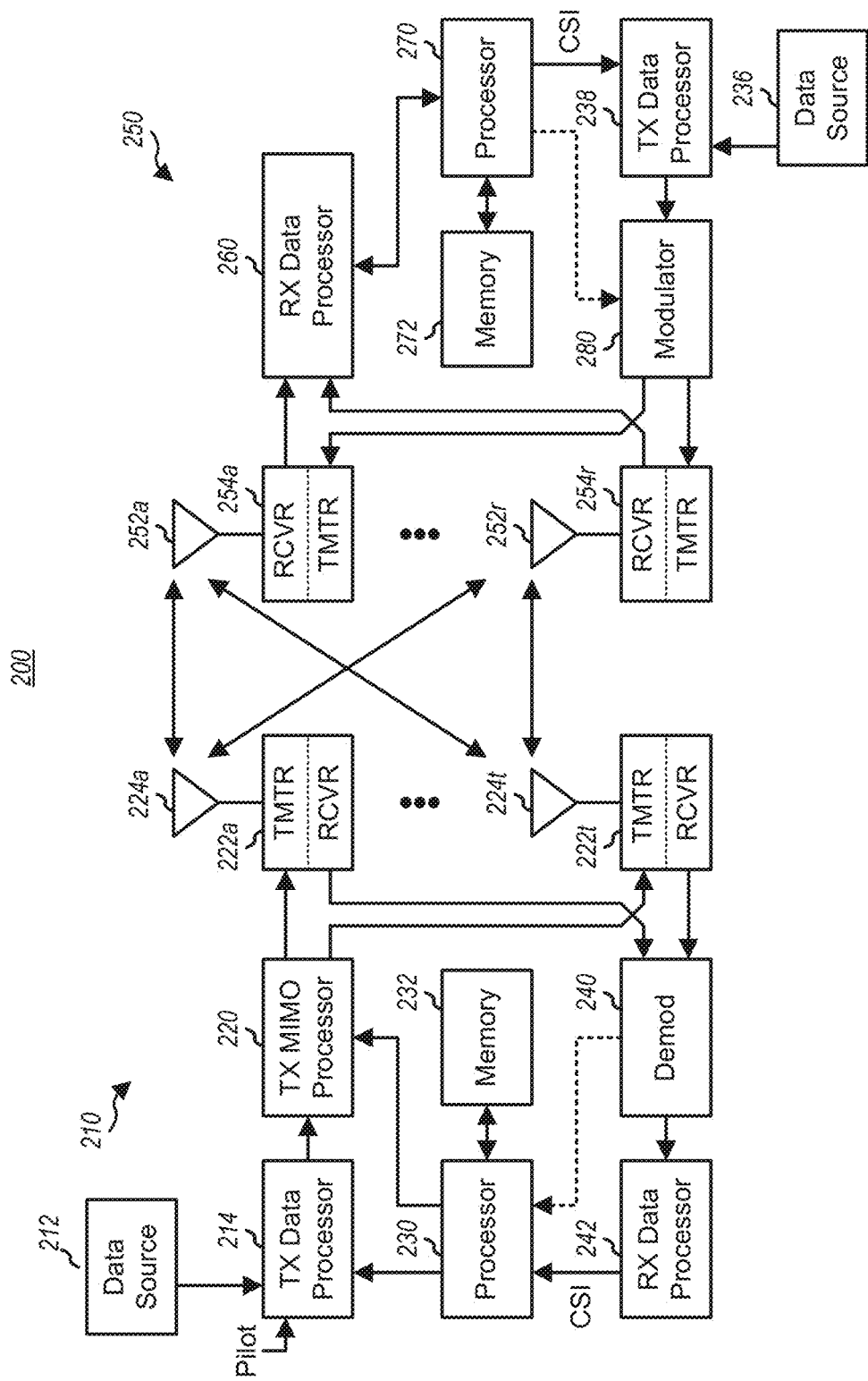
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
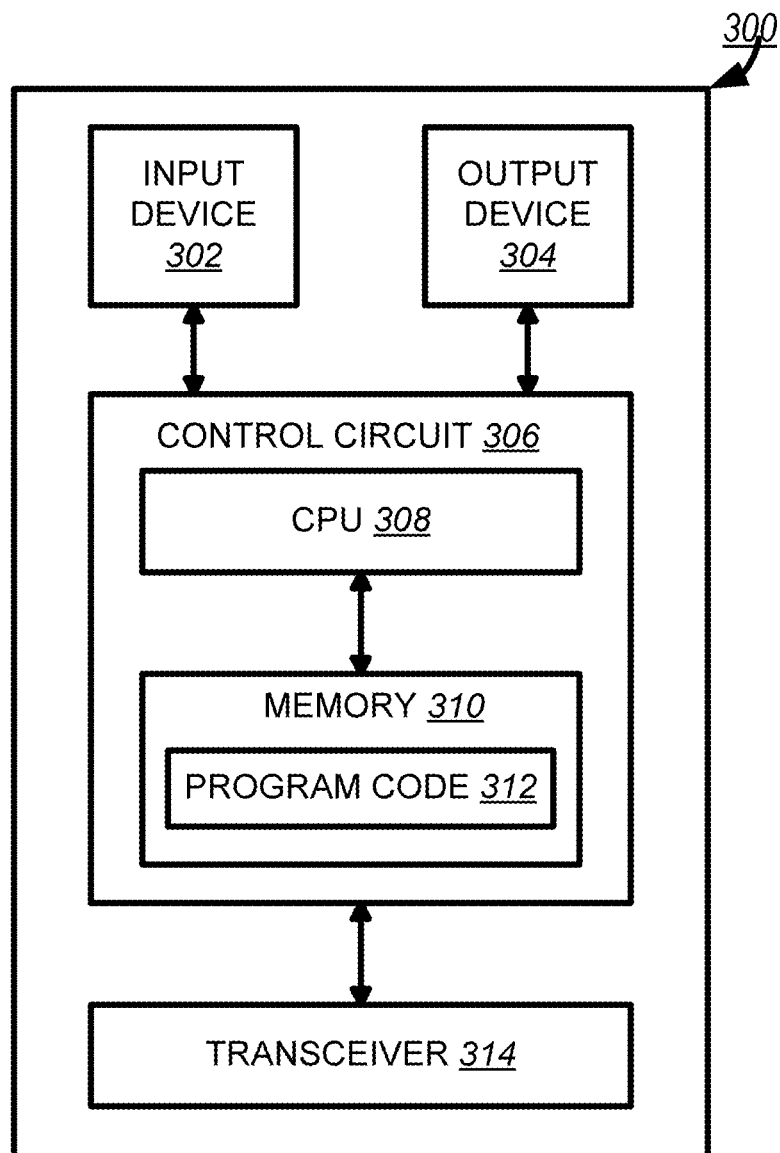
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
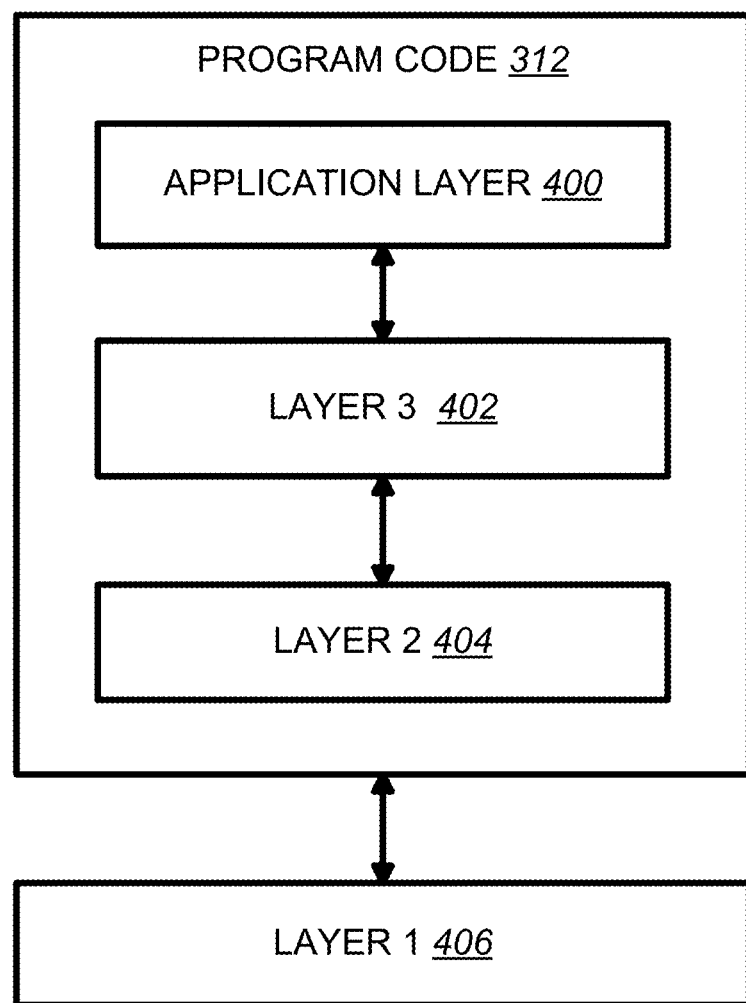
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.212 provides the following description of DCI (Downlink Control Information) format (of signal transmitted on PDCCH (Physical Downlink Control Channel)) as included in 3GPP R1-1801292:

7.3.1 DCI Formats
The DCI Formats Defined in Table 7.3.1-1 are Supported. [Table 7.3.1-1 of 3GPP TS 38.212, entitled "DCI formats", is reproduced as FIG. 5]
7.3.1.2 DCI formats for scheduling of PDSCH
7.3.1.2.1 Format 1_0
DCI format 1_0 is used for the scheduling of PDSCH in one DL cell.
The following information is transmitted by means of the DCI format 1_0 with CRC scrambled by C-RNTI:
Identifier for DCI formats—[1] bits
Frequency domain resource assignment—$\lceil \log_2 (N_{RB}^{DLBWP}(N_{RB}^{LBWP}+1)/2) \rceil$ bits
$N_{RB}^{DLBWP}$ is the size of the initial bandwidth part in case DCI format 1_0 is monitored in the common search space in CORESET 0
$N_{RB}^{DLBWP}$ is the size of the active bandwidth part otherwise
Time domain resource assignment—X bits as defined in Subclause 5.1.2.1 of [6, TS38.214]
VRB-to-PRB mapping—1 bit
Modulation and coding scheme—5 bits as defined in Subclause 5.1.3 of [6, TS38.214]
New data indicator—1 bit
Redundancy version—2 bits as defined in Table 7.3.1.1.1-2
HARQ process number—4 bits
Downlink assignment index—2 bits as defined in Subclause 9.1.3 of [5, TS38.213], as counter DAI
TPC command for scheduled PUCCH—[2] bits as defined in Subclause 7.2.1 of [5, TS38.213]
PUCCH resource indicator—[2] bits as defined in Subclause 9.2.3 of [5, TS38.213]
PDSCH-to-HARQ_feedback timing indicator—[3] bits as defined in Subclause x.x of [5, TS38.213]

The following information is transmitted by means of the DCI format 1_0 with CRC scrambled by P-RNTI:
Short Messages Indicator—1 bit. This bit is used to indicate whether the short message only or scheduling information only is carried in the Paging DCI.

The following information is transmitted by means of the DCI format 1_0 with CRC scrambled by SI-RNTI:
XXX—x bit The following information is transmitted by means of the DCI format 1_0 with CRC scrambled by RA-RNTI:
XXX—x bit The following information is transmitted by means of the DCI format 1_0 with CRC scrambled by CS-RNTI:
XXX—x bit If the number of information bits in format 1_0 prior to padding is less than the payload size of format 0_0 for scheduling the same serving cell, zeros shall be appended to format 1_0 until the payload size equals that of format 0_0.

7.3.1.2.2 Format 1_1
DCI format 1_1 is used for the scheduling of PDSCH in one cell.
The following information is transmitted by means of the DCI format 1_1 with CRC scrambled by C-RNTI:
Carrier indicator—0 or 3 bits as defined in Subclause x.x of [5, T538.213]. [ . . . ]
Time domain resource assignment—0, 1, 2, 3, or 4 bits as defined in Subclause 5.1.2.1 of [6, TS38.214]. The bitwidth for this field is determined as $\lceil \log_2(I) \rceil$ bits, where/is the number of rows in the higher layer parameter [pdsch-symbolAllocation].
[ . . . ]
Transmission configuration indication—0 bit if higher layer parameter tci-PresentInDCI is not enabled; otherwise 3 bits as defined in Subclause x.x of [6, TS38.214].

3GPP TS 38.214 provides the following description of DL (Downlink) resource assignment as included in 3GPP R1-1801294:

5.1.2.1 Resource allocation in time domain
When the UE is scheduled to receive PDSCH by a DCI, the Time domain resource assignment field of the DCI provides a row index of an RRC configured table pdsch-symbolAllocation, where the indexed row defines the slot offset $K_0$, the start and length indicator SLIV, and the PDSCH mapping type to be assumed in the PDSCH reception.
Given the parameter values of the indexed row:
The slot allocated for the PDSCH is $$\left\lfloor n \cdot \frac{2^{\mu_{PDSCH}}}{2^{\mu_{PDCCH}}} \right\rfloor + K_0,$$

where n is the slot with the scheduling DCI, and $K_0$ is based on the numerology of PDSCH, and
The starting symbol S relative to the start of the slot, and the number of consecutive symbols L counting from the symbol S allocated for the PDSCH are determined from the start and length indicator SLIV:
if (L−1)≤7 then
SLIV=14·(L−1)+S
else
SLIV=14·(14−L+1)+(14−1−S)
where 0<L≤14−S, and
The PDSCH mapping type is set to Type A or Type B as defined in sub-clause 7.4.1.1.2 of [4, TS 38.211].
The UE shall consider the S and L combinations satisfying the following conditions as valid PDSCH allocations:
For PDSCH mapping type A: S∈{0, 1, 2, 3} LE ∈ {[X], . . . , 14}
For PDSCH mapping type B: S∈{0, . . . , 12}, L∈{2, 4, 7}
The UE is not expected to receive any TB across slot boundaries determined by the numerology associated with the PDSCH transmission.
When the UE is configured with aggregationFactorDL>1, the UE may expect that the TB is repeated within each symbol allocation among each of the aggregationFactorDL consecutive slots and the PDSCH is limited to a single transmission layer.

If the UE procedure for determining slot configuration as defined in Subclause 11.1 of [6, TS 38.213] determines symbol of a slot allocated for PDSCH as uplink symbols, the transmission on that slot is omitted for multi-slot PDSCH transmission.

There are some agreements on beam management in the RAN1 #86 meeting, as stated in the Final Report of 3GPP TSG RAN WG1 #86 v1.0.0 (Gothenburg, Sweden, 22-26 Aug. 2016) as follows:
  Beam management=a set of L1/L2 procedures to acquire and maintain a set of TRP(s) and/or UE beams that can be used for DL and UL transmission/reception, which include at least following aspects:
    Beam determination=for TRP(s) or UE to select of its own Tx/Rx beam(s).
    Beam measurement=for TRP(s) or UE to measure characteristics of received beamformed signals
    Beam reporting=for UE to report information a property/quality of beamformed signal(s) based on beam measurement
    Beam sweeping=operation of covering a spatial area, with beams transmitted and/or received during a time interval in a predetermined way.

There are some agreements on beam management in the RAN1 #86 bis meeting, as stated in the Final Report of 3GPP TSG RAN WG1 #86 bis v1.0.0 (Lisbon, Portugal, 10-14 Oct. 2016) as follows:
Agreements:
  For downlink, NR supports beam management with and without beam-related indication
    When beam-related indication is provided, information pertaining to UE-side beamforming/receiving procedure used for data reception can be indicated through QCL to UE There are some agreements on beam management in the RAN1 #87 meeting, as stated in the Final Report of 3GPP TSG RAN WG1 #87 v1.0.0 (Reno, USA, 14-18 Nov. 2016) as follows:
Agreements:
  NR supports with and without a downlink indication to derive QCL assumption for assisting UE-side beamforming for downlink control channel reception There are some agreements on beam management in the RAN1 # AH1_NR meeting, as stated in the Final Report of 3GPP TSG RAN WG1 # AH1_NR v1.0.0 (Spokane, USA, 16-20 Jan. 2017) as follows:
Agreements:
  For reception of DL control channel, support indication of spatial QCL assumption between an DL RS antenna port(s), and DL RS antenna port(s) for demodulation of DL control channel
    Note: Indication may not be needed for some cases:
  For reception of DL data channel, support indication of spatial QCL assumption between DL RS antenna port(s) and DMRS antenna port(s) of DL data channel
    Different set of DMRS antenna port(s) for the DL data channel can be indicated as QCL with different set of RS antenna port(s)
    Option 1: Information indicating the RS antenna port(s) is indicated via DCI
    Option 2: Information indicating the RS antenna port(s) is indicated via MAC-CE, and will be assumed until the next indication
    Option 3: Information indicating the RS antenna port(s) is indicated via a combination of MAC CE and DCI
    At least one option is supported
    Note: Indication may not be needed for some cases:

There are some agreements on beam management in the RAN1 #88 meeting, as stated in the Final Report of 3GPP TSG RAN WG1 #88 v1.0.0 (Athens, Greece, 13-17 Feb. 2017) as follows:
Agreements:
  For reception of unicast DL data channel, support indication of spatial QCL assumption between DL RS antenna port(s) and DMRS antenna port(s) of DL data channel: Information indicating the RS antenna port(s) is indicated via DCI (downlink grants)
    The information indicates the RS antenna port(s) which is QCL-ed with DMRS antenna port(s)
    Note: related signalling is UE-specific There are some agreements on beam management in the RAN1 #89 meeting, as stated in the Final Report of 3GPP TSG RAN WG1 #89 v1.0.0 (Hangzhou, China, 15-19 May 2017) as follows:
Agreements:
  Support spatial QCL assumption between antenna port(s) within a CSI-RS resource(s) and antenna port of an SS Block (or SS block time index) of a cell
    The other QCL parameters not precluded
    Note: default assumption may be no QCL
  Configuration of QCL for UE specific NR-PDCCH is by RRC and MAC-CE signalling
    Note that MAC-CE is not always needed
    Note: For example, DL RS QCLed with DMRS of PDCCH for delay spread, Doppler spread, Doppler shift, and average delay parameters, spatial parameters There are some agreements on beam management in the RAN1 # AH_NR3 meeting, as stated in the Final Report of 3GPP TSG RAN WG1 # AH_NR3 v1.0.0 (Nagoya, Japan, 18-21 Sep. 2017) as follows:
Agreement:
A UE is RRC configured with a list of up to M candidate Transmission Configuration Indication (TCI) states at least for the purposes of QCL indication
  Each TCI state can be configured with one RS Set
  Each ID (FFS: details of ID) of DL RS at least for the purpose of spatial QCL in an RS Set can refer to one of the following DL RS types:
    SSB
    Periodic CSI-RS
    Aperiodic CSI-RS
    Semi-persistent CSI-RS
Agreement:
The QCL configuration for PDCCH contains the information which provides a reference to a TCI state
  Note: The indication of QCL configuration is done by RRC or RRC+MAC CE
Agreement:
  For QCL indication for PDSCH:
    When TCI states are used for QCL indication, the UE receives an N-bit TCI field in DCI
      The UE assumes that the PDSCH DMRS is QCL with the DL RS(s) in the RS Set corresponding to the signaled TCI state
  FFS: Timing between when the UE receives a QCL configuration/indication and the first time that the QCL assumption may be applied for demodulation of PDSCH or PDCCH There are some agreements on beam management in the RAN1 #90 bis meeting, as stated in the Final Report of 3GPP TSG RAN WG1 #90 bis v1.0.0 (Prague, Czech Rep, 9-13 Oct. 2017) as follows:

Agreement:
Support at least the explicit approach for the update of spatial QCL reference in a TCI state.
  Note: In the explicit approach, the TCI state is updated using either RRC or RRC+MAC-CE based approach
  Note: In the implicit approach, when a set of aperiodic CSI-RS resources are triggered, the triggering DCI includes a TCI state index which provides spatial QCL reference for the triggered set of CSI-RS resources. Following the measurement, the spatial QCL reference in the RS set corresponding to the indicated TCI state is updated based on the preferred CSI-RS determined by the UE. Other operations of implicit approaches are not precluded.

R1-1719059 WF on Beam Management
Agreement:
  Proposal: Update the association of TCI state and DL RS
    Initialization/Update of the ID of a DL RS(s) in the RS Set used at least for spatial QCL purposes is done at least via explicit signalling. Support the following methods for the explicit signalling:
      RRC
      RRC+MAC-CE
  Proposal: Presence of TCI in DCI
  For the case when at least spatial QCL is configured/indicated, support higher-layer UE-specific configuration of whether or not TCI field is present in DL-related DCI
    Not present: No dynamic indication of QCL parameters for PDSCH is provided in DL-related DCI
      For PDSCH, UE applies higher-layer signalling of QCL parameters/indication for determining QCL parameters except for the case of beam management without beam-related indication (ref:Annex) where no spatial QCL parameters are higher layer configured
    Present: Details on next proposal.
    Proposed candidate solutions should consider
      Below and above 6 GHz DL beam related operation with and without beam indication
      Downlink beam management with and without beam indication (ref Annex)
  Note: this proposal does not apply to the case of beam management without beam-related indication (ref:Annex)
  Proposal: Timing issue of beam indication for PDSCH
  For the case when at least spatial QCL is configured/indicated, NR supports the beam indication for PDSCH as follows, if TCI field is present:
    The TCI field is always present in the associated DCI for PDSCH scheduling irrespective of same-slot scheduling or cross-slot scheduling.
    If the scheduling offset<threshold K: PDSCH uses a pre-configured/pre-defined/rule-based spatial assumption
      Threshold K can be based on UE capability only if multiple candidate values of K are supported.
    If the scheduling offset>=threshold K: PDSCH uses the beam (spatial QCL parameter) indicated by the N-bit TCI field in the assignment DCI.
  Note: this proposal does not apply to the case of beam management without beam-related indication
Agreements:
  Support parameter Is-TCI-Present
    Whether for the case when at least spatial QCL is configured/indicated, if TCI field is present or not present in DL-related DCI.
    Boolean
    Default is True
  For the case when TCI is not present in DL-related DCI, continue discussion of the details regarding higher-layer signaling of QCL parameters/indication for determining QCL parameters for PDSCH
  NR supports a mechanism to identify the spatial QCL if the offset between the time of reception of DL assignment for the PDSCH and time of reception of PDSCH is less than Threshold-Sched-Offset.
  NR does not support the RRC parameter in beam management: Threshold-Sched-Offset.
    FFS if such a parameter is included as a UE capability There are some agreements on beam management in the RAN1 #91 meeting, as stated in the Final Report of 3GPP TSG RAN WG1 #91 v1.0.0 (Reno, USA, 27 Nov.-1 Dec. 2017) as follows:
Agreement:
  The state Is-TCI-Present is configured on a per-CORESET basis
  For beam management with beam indication, on all CORESETs configured with Is-TCI-Present=false, the TCI state used for PDCCH is reused for PDSCH reception
Agreement:
  A candidate set of DL RSs are configured using RRC mechanism
    Each state of M TCI states is RRC configured with a downlink RS set used as a QCL reference, and MAC-CE is used to select up to 2^N TCI states out of M for PDSCH QCL indication
    The same set of M TCI states are reused for CORESET
    K TCI states are configured per CORESET
      When K>1, MAC CE can indicate which one TCI state to use for control channel QCL indication
      When K=1, no additional MAC CE signaling is necessary
Agreement:
  When the scheduling offset is <=k, the PDSCH uses QCL assumption that is based on a default TCI state (e.g. the first state of the 2^N states used for PDSCH QCL indication)
Agreement
Between initial RRC configuration and MAC CE activation of TCI states, the UE may assume that both PDCCH and PDSCH DMRS are spatially QCL-ed with the SSB determined during initial access
Agreement:
  When the scheduling offset is <=k, and the PDSCH uses QCL assumption that is based on a default TCI state
    The default TCI state corresponds to the TCI state used for control channel QCL indication for the lowest CORESET ID in that slot One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

When UE receives a PDSCH (Physical Downlink Shared Channel), UE may determine PDSCH antenna port quasi co-colocation according to the TCI (Transmission Configuration Indication) field in the scheduling PDCCH (Physical Download Control Channel). However, if TCI-PresentInDCI is set as "Disabled" or not set as "Enabled" for the CORESET (Control Resource Set) scheduling the PDSCH or the PDSCH is scheduled by a DCI (Downlink Control Information) format 1_0, for determining PDSCH antenna port quasi co-location, the UE assumes that the TCI state for the PDSCH is identical to the TCI state applied for the CORESET used for the PDCCH transmission. In other words, UE uses the TCI state/spatial parameter/beam for receiving the CORESET, where the scheduling PDCCH is received/monitored, to receive the corresponding PDSCH. However, for cross carrier scheduling case, the story may be different.

For cross carrier scheduling case, the CORESET configuration of scheduled serving cell and scheduling serving cell can be categorized into at least the following cases:

Case 1: Network does not configure CORESET configuration for scheduled serving cell. In other words, the network is prevented from or is not allowed to configure CORESET configuration for scheduled serving cell. UE receives or monitors PDCCH for scheduled serving cell on CORESETs of scheduling serving cell. In other words, UE receive or monitors PDCCH for scheduled serving cell based on CORESET configuration of scheduling serving cell. For example, a scheduled serving cell is Cell 1 and a scheduling serving cell is Cell 2. PDCCH of Cell 1 is transmitted on CORESETs of Cell 2. UE receives/monitors PDCCH of Cell 1 on CORESETs of Cell 2.

Case 2: Network configures CORESET configuration for scheduled serving cell. UE receives or monitors PDCCH for scheduled serving cell on CORESETs of scheduled serving cell. In one embodiment, the CORESETs of scheduled serving cell may be transmitted on (frequency resources of) scheduling serving cell. In other words, UE receives or monitors PDCCH for scheduled serving cell based on CORESET configuration of scheduled serving cell. For example, a scheduled serving cell is Cell 1 and a scheduling serving cell is Cell 2. PDCCH of Cell 1 is transmitted on CORESETs of Cell 1. UE monitors PDCCH of Cell 1 on CORESETs of Cell 1. In one embodiment, the CORESETs of Cell 1 are transmitted on (frequency resources of) Cell 2. More specifically, UE monitors PDCCH of Cell 1 on CORESETs of Cell 1, which is located on frequency resources of Cell 2.

For Case 1, UE receives a PDCCH transmitted on the CORESET(s) of Cell 2, wherein the PDCCH schedules a PDSCH transmitted on Cell 1. If TCI field is not present in the DL DCI of the PDCCH transmitted on the CORESET(s) of Cell 2, for determining PDSCH antenna port quasi co-location, UE may assume that the TCI state for the PDSCH is identical to the TCI state applied for the CORESET(s), which is of Cell 2 and used for the PDCCH transmission. The reason why TCI field is not present in the DL DCI of the PDCCH may be resulted from that TCI-PresentInDCI is set as "Disabled" for the CORESET scheduling the PDSCH or the PDSCH is scheduled by a DCI format 1_0. However, the TCI state applied for the CORESET(s) of Cell 2 may not be appropriate for PDSCH transmitted on Cell 1, at least for cases that Cell 1 and Cell 2 are interband carriers. For example, Cell 1 is a carrier located on frequency band above 6 GHz and Cell 2 is a carrier located on frequency band below 6 GHz.

Hence, for cross carrier scheduling case, at least for Case 1, how to receive the PDSCH of scheduled serving cell if the scheduling PDCCH, transmitted on the CORESETs of scheduling serving cell, does not comprise a TCI field (TCI field is not present) may need to be considered. That is, how to decide the TCI state (or spatial parameter or receiving beam) to receive the PDSCH transmitted on the scheduled serving cell.

For Case 2, UE receives a PDCCH transmitted on the CORESET(s) of Cell 1, wherein the PDCCH schedules a PDSCH transmitted on Cell 1. In one embodiment, the CORESETs of Cell 1 are transmitted on frequency resources of Cell 2. Although Cell 1 has its own CORESET(s) transmitted on Cell 2, UE may use the TCI states/spatial parameters/beams, for receiving CORESETs of Cell 2, to receive CORESETs of Cell 1. In one embodiment, a set of TCI states (TCI-StatesPDCCH), providing quasi co-location information for receiving PDCCH, may or may not be configured in CORESET configuration of Cell 1.

Since UE receives a PDCCH scheduling PDSCH of Cell 1, wherein the scheduling PDCCH is transmitted on the CORESET(s) of Cell 1, UE may assume the scheduling PDCCH comprises a TCI field if the TCI-PresentinDCI in CORESET configuration of Cell 1 is "Enabled", vice versa. Hence, at least for PDCCH with DCI formats, which can comprise a TCI field (e.g. DCI format 1_1), network can choose or schedule suitable TCI state, spatial parameter, or beam for UE to receive PDSCH of Cell 1.

For example, if the TCI-PresentinDCI in CORESET configuration of Cell 1 is "Disabled", UE may use the TCI state, for receiving CORESETs of Cell 1, to receive the PDSCH of Cell 1. Since UE may use the TCI states, spatial parameters, or beams, for receiving CORESETs of Cell 2, to receive CORESETs of Cell 1, it may (implicitly) mean that network consider that the TCI states, spatial parameters, or beams, for receiving CORESETs of Cell 2 are appropriate for receiving PDSCH of Cell 1, e.g. Cell 1 and Cell 2 are intraband carriers. On the other hand, if the TCI-PresentinDCI in CORESET configuration of Cell 1 is "Enabled", UE may receive the PDSCH of Cell1 based on the TCI field in the decoded scheduling PDCCH. It may (implicitly) mean that network consider that the TCI states, spatial parameters, or beams, for receiving CORESETs of Cell 2 is not appropriate for receiving PDSCH of Cell 1, e.g. Cell 1 and Cell 2 are interband carriers.

However, for PDCCH with DCI formats, which does not comprise a TCI field (e.g. a fallback DCI format, DCI format 1_0), the issue in Case 1 still exists, i.e. how to decide the TCI state (or spatial parameter or receiving beam) to receive the PDSCH transmitted on the scheduled serving cell.

In this invention, the following solutions or embodiments are provided, which can be at least (but not limited to) used to handle, at least for cross carrier scheduling cases, how to determine the TCI states, spatial parameters, or receiving beams for receiving the PDSCH of scheduled serving cell if the UE is not able to determine that based on the scheduling PDCCH transmitted on the scheduling serving cell, e.g. TCI field is not present in the scheduling PDCCH.

One general concept of this invention is that if DL DCI of a scheduling PDCCH (transmitted on a scheduling CORESET of a serving cell) is not supposed to comprise or provide quasi co-location information for receiving the scheduled PDSCH for another serving cell, a UE may not determine the PDSCH antenna port quasi co-location for receiving the scheduled PDSCH based on the quasi co-colocation information for receiving the scheduling CORESET. In one embodiment, if DL DCI of a scheduling PDCCH (transmitted on a scheduling CORESET of a serving cell) is not supposed to comprise or carry a TCI field and the scheduled PDSCH is for another serving cell, the UE may not use the TCI state applied for the scheduling CORESET to receive the scheduled PDSCH. Furthermore, if DL DCI of a scheduling PDCCH, transmitted on a scheduling CORESET of a serving cell, is not supposed to comprise or carry a TCI field and the scheduled PDSCH is for another serving cell, the UE may not assume that the TCI state for the scheduled PDSCH is identical to the TCI state applied for the scheduling CORESET.

In one embodiment, if TCI-PresentInDCI is set as "Disabled" for the scheduling CORESET of a serving cell wherein the scheduling CORESET schedules a PDSCH for another serving cell, or the PDSCH is scheduled by PDCCH with a fallback DCI (e.g. DCI format 1_0), for determining PDSCH antenna port quasi co-location, the UE may assume that the TCI state for the PDSCH is not identical to the TCI state applied for the scheduling CORESET used for the PDCCH transmission. For example, if a PDCCH is transmitted on a scheduling CORESET of a serving cell, wherein the PDCCH schedules PDSCH for another serving cell, and if the PDCCH is not supposed to comprise or provide quasi co-location information, for determining PDSCH antenna port quasi co-location, the UE may assume that the TCI state for receiving the scheduled PDSCH is identical to a default TCI state.

In one embodiment, the default TCI state could be one of TCI states in the activated TCI states for receiving PDSCH in the scheduled serving cell. Alternatively, the default TCI state could be a TCI state mapped to one of codeponints in the TCI field for receiving PDSCH in the scheduled serving cell, a TCI state with the lowest TCI state ID in the activated TCI states for receiving PDSCH in the scheduled serving cell, a TCI state mapped to codepoint 0 in the TCI field for receiving PDSCH in the scheduled serving cell, a TCI state applied for receiving at least one of CORESETs configured for the scheduling serving cell and/or the scheduled serving cell, or a TCI state applied for receiving the CORESET with the lowest CORESET ID among the CORESETs configured for the scheduling serving cell and/or the scheduled serving cell.

Another general concept of this invention is that if DL DCI of a scheduling PDCCH, transmitted on a scheduling CORESET of a serving cell, is not supposed to comprise or provide quasi co-location information for receiving the scheduled PDSCH which is for another serving cell, a UE determines the antenna port quasi co-location for receiving the scheduled PDSCH based on higher layer configuration, for example, an indicator.

Another general concept of this invention is that if network configures a corresponding CORESET configuration for scheduled serving cells, the parameter providing quasi co-location information for receiving PDCCH (e.g. TCI-StatesPDCCH in the CORESET configuration or in a CORESET) may or may not be configured. In one embodiment, if network configures a corresponding CORESET configuration for scheduled serving cells, the parameter providing quasi co-location information for receiving PDCCH (e.g. TCI-StatesPDCCH) may be ignored or may not be used when PDCCH of scheduled serving cell is transmitted on scheduling serving cell.

In one embodiment, if network configures a corresponding CORESET configuration for scheduled serving cells, TCI-StatesPDCCH in CORESETs of scheduled serving cell may be ignored or may not be used by a UE when the UE receives or monitors PDCCH of scheduled serving cell on scheduling serving cell. Alternatively, if network configures a corresponding CORESET configuration for scheduled serving cells, the UE may use the TCI states, spatial parameters, or receiving beams for receiving CORESETs of the scheduling serving cell, to receive CORESETs of the scheduled serving cell. Alternatively, if network configures a corresponding CORESET configuration for scheduled serving cells, TCI-StatesPDCCH in CORESETs of scheduled serving cell may comprise a set of TCI states, wherein the set of TCI states are associated with reference signals transmitted in the scheduling serving cell. Alternatively, if network configures a corresponding CORESET configuration for scheduled serving cells, the UE may interpret the RS indices in TCI-StatesPDCCH in CORESETs of scheduled serving cell via associating that with reference signals transmitted in the scheduling serving cell.

Embodiment 1

A UE is configured with a first serving cell and a second serving cell. The control signal of the first serving cell is transmitted on the second serving cell, e.g. PDCCH scheduling PDSCH. The downlink data transmission of the first serving cell is transmitted on the first serving cell.

The UE receives and/or monitors a first PDCCH transmitted on a scheduling CORESET of the second serving cell, wherein the first PDCCH schedules a first PDSCH. The first PDSCH is transmitted on the first serving cell. In one embodiment, the UE could receive and/or monitor a second PDCCH transmitted on the scheduling CORESET, wherein the second PDCCH schedules a second PDSCH. The second PDSCH could be transmitted on the second serving cell.

In one embodiment, if TCI-PresentInDCI is set as "Disabled" or not set as "Enabled" for the scheduling CORESET, for determining PDSCH antenna port quasi co-location, the UE could assume that the TCI state for receiving the second PDSCH is identical to the TCI state applied for the scheduling CORESET. In one embodiment, if the second PDSCH is scheduled by a fallback DCI (e.g. DCI format 1_0), for determining PDSCH antenna port quasi co-location, the UE could assume that the TCI state for receiving the second PDSCH is identical to the TCI state applied for the scheduling CORESET.

In one embodiment, from perspective of network, it may mean that the network transmits the second PDSCH to the UE in a way that the UE is able to receive the second PDSCH via the TCI state applied for receiving the scheduling CORESET, if TCI-PresentInDCI is not set as "Enabled" for the scheduling CORESET.

In one embodiment, from perspective of network, it may mean that the network transmits the second PDSCH to the UE, wherein the UE is able to receive the second PDSCH via the TCI state applied for receiving the scheduling CORESET, if the second PDSCH is scheduled by a fallback DCI.

If the UE assumes the TCI state for receiving the second PDSCH is identical to the TCI state applied for the scheduling CORESET, it may mean that the UE receives the second PDSCH via the TCI state applied for receiving the scheduling CORESET.

In one embodiment, if TCI-PresentInDCI is set as "Disabled" or not set as "Enabled" for the scheduling CORESET, for determining PDSCH antenna port quasi co-location, the UE may not assume that the TCI state for the first PDSCH is identical to the TCI state applied for the scheduling CORESET.

In one embodiment, if the first PDSCH is scheduled by a fallback DCI (e.g. DCI format 1_0), for determining PDSCH antenna port quasi co-location, the UE may not assume that the TCI state for the first PDSCH is identical to the TCI state applied for the scheduling CORESET. If the UE does not assume the TCI state for receiving the first PDSCH is identical to the TCI state applied for the scheduling CORESET, it may mean that the UE receives the first PDSCH via a TCI state not applied for receiving the scheduling CORESET.

The following alternatives are provided for determining the TCI state applied for the first PDSCH, for determining PDSCH antenna port quasi co-location, if TCI-PresentInDCI is set as "Disabled" or not set as "Enabled" for the scheduling CORESET, or if the first PDSCH is scheduled by a fallback DCI (e.g. DCI format 1_0).

Alternative 1—

The UE assumes the DL DCI of the first PDCCH comprises or carries a TCI field regardless of that TCI-PresentInDCI is set as "Disabled" for the scheduling CORESET. The UE assumes the DL DCI of the first PDCCH comprises or carries a TCI field regardless of the first PDSCH is scheduled by a fallback DCI (e.g. DCI format 1_0). In one embodiment, the UE could receive and decode the DL DCI of the first PDCCH via assuming the first PDCCH comprises or carries a TCI field. The UE could also receive the first PDSCH via PDSCH antenna port quasi co-location derived from the value of the TCI field in the first PDCCH.

In one embodiment, if TCI-PresentInDCI is set as "Disabled" or not set as "Enabled" for the scheduling CORESET or the first PDSCH is scheduled by a fallback DCI (e.g. DCI format 1_0), the UE may assume that the DL DCI of the first PDCCH comprises or carries a TCI field regardless of TCI-PresentInDCI being set as "Disabled" for the scheduling CORESET or the first PDSCH being scheduled by a fallback DCI (e.g. DCI format 1_0).

In one embodiment, the UE could use the TCI-States according to the value of the TCI field in the first PDCCH for determining PDSCH antenna port quasi co-location.

Alternative 2—

The TCI state applied for receiving the scheduling CORESET is at least associated with index of a first reference signal and index of a second reference signal and corresponding QCL types. The first reference signal is transmitted on the first serving cell and the second reference signal is transmitted on the second serving cell.

If TCI-PresentInDCI is set as "Disabled" for the scheduling CORESET or if the first PDSCH is scheduled by a fallback DCI (e.g. DCI format 1_0), the UE could receive the first PDSCH via PDSCH antenna port quasi co-location derived from the index of the first reference signal and corresponding QCL type in a TCI state applied for receiving the scheduling CORESET.

If TCI-PresentInDCI is set as "Disabled" for the scheduling CORESET or if the second PDSCH is scheduled by a fallback DCI (e.g. DCI format 1_0), the UE could receive the second PDSCH via PDSCH antenna port quasi co-location derived from the index of the second reference signal and corresponding QCL type in a TCI state applied for receiving the scheduling CORESET.

In one embodiment, the association between the TCI state applied for the scheduling CORESET and the first reference signal could be configured in the configuration of the first serving cell, e.g. configuration related to cross carrier scheduling (CrossCarrierSchedulingConfig). Alternatively, the association between the TCI state applied for the scheduling CORESET and the first reference signal could be configured in the configuration of the second serving cell, e.g. CORESET configuration of the second serving cell.

Alternative 3—

If TCI-PresentInDCI is set as "Disabled" or not set as "Enabled" for the scheduling CORESET or the first PDSCH is scheduled by a fallback DCI (e.g. DCI format 1_0), the UE could assume that the TCI state for receiving the first PDSCH is identical to a default TCI state. In one embodiment, if TCI-PresentInDCI is set as "Disabled" or not set as "Enabled" for the scheduling CORESET, the UE may assume that the TCI state for receiving the first PDSCH is identical to a default TCI state. In one embodiment, if the first PDSCH is scheduled by a fallback DCI (e.g. DCI format 1_0), the UE could assume that the TCI state for receiving the first PDSCH is identical to a default TCI state. If the UE assumes the TCI state for receiving the first PDSCH is identical to a default TCI state, it may mean that the UE receives the first PDSCH via the default TCI state.

From perspective of network, it may mean that the network transmits the first PDSCH to the UE in a way that the UE is able to receive the first PDSCH via a default TCI state, if TCI-PresentInDCI is not set as "Enabled" for the scheduling CORESET or if the first PDSCH is scheduled by a fallback DCI. Furthermore, it may mean that the network transmits the first PDSCH to the UE in a way that the UE is able to receive the first PDSCH via a default TCI state, if TCI-PresentInDCI is not set as "Enabled" for the scheduling CORESET. In addition, it may mean that the network transmits the first PDSCH to the UE, wherein the UE is able to receive the first PDSCH via a default TCI state, if the first PDSCH is scheduled by a fallback DCI.

In one embodiment, if TCI-PresentInDCI is set as "Disabled" or not set as "Enabled" for the scheduling CORESET or if the first PDSCH is scheduled by a fallback DCI (e.g. DCI format 1_0), the UE could receive the first PDSCH via the PDSCH antenna port quasi co-location derived from the default TCI state. In particular, if TCI-PresentInDCI is set as "Disabled" or not set as "Enabled" for the scheduling CORESET, the UE could receive the first PDSCH via the PDSCH antenna port quasi co-location derived from the default TCI state. Furthermore, if the first PDSCH is scheduled by a fallback DCI (e.g. DCI format 1_0), the UE could receive the first PDSCH via the PDSCH antenna port quasi co-location derived from the default TCI state. If TCI-PresentInDCI is set as "Disabled" for the scheduling CORESET, it may mean that TCI-PresentInDCI is not set as "Enabled" for the scheduling CORESET.

In one embodiment, the default TCI state could be one of TCI states in the activated TCI states for receiving PDSCH in the first serving cell. In particular, the default TCI state could be a TCI state mapped to one of codepoints in the TCI field for receiving PDSCH in the first serving cell, a TCI state with the lowest TCI state ID in the activated TCI states for receiving PDSCH in the first serving cell, a TCI state with the lowest TCI state ID in the configured TCI states for receiving at least downlink transmission in the first serving cell, a TCI state mapped to codepoint 0 in the TCI field for receiving PDSCH in the first serving cell, a TCI state applied for receiving at least one of CORESETs configured for or monitored in the first serving cell and/or the second serving cell, and/or a TCI state applied for receiving the CORESET with the lowest CORESET ID among the CORESETs configured for or monitored in the first serving cell and/or the second serving cell.

Alternative 4—

The UE receives the first PDSCH via a TCI state applied for the scheduling CORESET, for determining PDSCH antenna port quasi co-location, if TCI-PresentInDCI is set as "Disabled" or not set as "Enabled" for the scheduling CORESET or the first PDSCH is scheduled by a fallback DCI (e.g. DCI format 1_0). The TCI state applied for receiving the scheduling CORESET could be associated with index of reference signals transmitted on the second serving cell and corresponding QCL types.

If TCI-PresentInDCI is set as "Disabled" or not set as "Enabled" for the scheduling CORESET or the first PDSCH is scheduled by a fallback DCI (e.g. DCI format 1_0), the UE could receive the first PDSCH via PDSCH antenna port quasi co-location derived from an index of a first reference signal transmitted in the first serving cell and corresponding QCL (Quasi Co-Location) type.

The first reference signal could be associated with the second reference signal. In one embodiment, the first reference signal could be derived from the second reference signal. The association between the first reference signal and the second reference signal could be (explicitly) configured to the UE, specified to the UE (e.g. specified in the specification), or (implicitly) derived by the UE. More specifically, the association between the first reference signal and the second reference signal could be (implicitly) derived by the UE via a rule, e.g. mapping between the index of the first reference signal and the index of the second reference signal.

Embodiment 2

A UE is configured with a first serving cell and a second serving cell. The control signal of the first serving cell is transmitted on the second serving cell, e.g. PDCCH scheduling PDSCH. The downlink data transmission of the first serving cell is transmitted on the first serving cell.

The UE could receive and/or monitor a first PDCCH transmitted on a scheduling CORESET of the second serving cell, wherein the first PDCCH schedules a first PDSCH. The first PDSCH could be transmitted on the first serving cell. In one embodiment, the UE could receive and/or monitor a second PDCCH transmitted on the scheduling CORESET, wherein the second PDCCH schedules a second PDSCH. The second PDSCH could be transmitted on the second serving cell.

In one embodiment, the UE could determine PDSCH antenna port quasi co-location e for receiving the first PDSCH based on an indicator, for determining PDSCH antenna port quasi co-location, if TCI-PresentInDCI is set as "Disabled" or not set as "Enabled" for the scheduling CORESET or if the first PDSCH is scheduled by a fallback DCI (e.g. DCI format 1_0). In one embodiment, the UE could receive the first PDSCH via PDSCH antenna port quasi co-location derived from the value of the TCI field in the first PDCCH based on the value of the indicator.

If TCI-PresentInDCI is set as "Disabled" or not set as "Enabled" for the scheduling CORESET or if the second PDSCH is scheduled by a fallback DCI (e.g. DCI format 1_0), for determining PDSCH antenna port quasi co-location, the UE could assume that the TCI state for receiving the second PDSCH is identical to the TCI state applied for the scheduling CORESET.

If TCI-PresentInDCI is set as "Disabled" or not set as "Enabled" for the scheduling CORESET or if the first PDSCH is scheduled by a fallback DCI (e.g. DCI format 1_0), for determining PDSCH antenna port quasi co-location, the UE could determine the TCI state for receiving the first PDSCH based on higher layer configuration, e.g. an indicator.

The following alternatives are provided for determining the TCI state applied for the first PDSCH based on RRC configuration, e.g. an indicator, for determining PDSCH antenna port quasi co-location, if TCI-PresentInDCI is set as "Disabled" for the scheduling CORESET or if the first PDSCH is scheduled by a fallback DCI (e.g. DCI format 1_0).

Alternative 1 of Embodiment 2

If the indicator indicates "1" or "True" or "Enabled", and if TCI-PresentInDCI is set as "Disabled" or not set as "Enabled" for the scheduling CORESET or the first PDSCH is scheduled by a fallback DCI (e.g. DCI format 1_0), for determining PDSCH antenna port quasi co-location, the UE could assume that the TCI state for the first PDSCH is identical to the TCI state applied for the scheduling CORESET.

If the indicator indicates "0" or "False" or "Disabled" and if TCI-PresentInDCI is set as "Disabled" for or not set as "Enabled" the scheduling CORESET or the first PDSCH is scheduled by a fallback DCI (e.g. DCI format 1_0), the UE could assume that the DL DCI of the first PDCCH comprises or carries a TCI field regardless of that TCI-PresentInDCI is set as "Disabled" for the scheduling CORESET or the first PDSCH is scheduled by a fallback DCI (e.g. DCI format 1_0).

In one embodiment, the UE could use the TCI-States according to the value of the TCI field in the first PDCCH for determining PDSCH antenna port quasi co-location if TCI-PresentInDCI is set as "Enabled" for the scheduling CORESET. The opposite result from the value of the indicator may not be precluded.

In one embodiment, if TCI-PresentInDCI is set as "Enabled" for the scheduling CORESET, for determining PDSCH antenna port quasi co-location, the UE could receive the first PDSCH via using the TCI-States according to the value of the "Transmission Configuration Indication" field in the first PDCCH regardless of the value of the indicator. If TCI-PresentInDCI is set as "Disabled" or not set as "Enabled" for the scheduling CORESET or the second PDSCH is scheduled by a fallback DCI (e.g. DCI format 1_0), the UE could assume that the TCI state for receiving the second PDSCH is identical to the TCI state applied for the scheduling CORESET regardless of the value of the indicator.

Alternative 2 of Embodiment 2

The TCI state applied for receiving the scheduling CORESET is at least associated with index of a first reference signals and index of a second reference signal and corresponding QCL types. The first reference signal is transmitted on the first serving cell and the second reference signal is transmitted on the second serving cell.

If the indicator indicates "1" or "True" or "Enabled" and if TCI-PresentInDCI is set as "Disabled" for the scheduling CORESET or the first PDSCH is scheduled by a fallback DCI (e.g. DCI format 1_0), for determining PDSCH antenna port quasi co-location, the UE could receive the first PDSCH via PDSCH antenna port quasi co-location derived from the index of the first reference signal and corresponding QCL type.

If the indicator indicates "0" or "False" or "Disabled" and if TCI-PresentInDCI is set as "Disabled" for the scheduling CORESET or the first PDSCH is scheduled by a fallback DCI (e.g. DCI format 1_0), the UE could receive the first PDSCH via PDSCH antenna port quasi co-location derived from the index of the second reference signal and corresponding QCL type. The opposite result from the value of the indicator may not be precluded.

In one embodiment, if TCI-PresentInDCI is set as "Enabled" for the scheduling CORESET, for determining PDSCH antenna port quasi co-location, the UE could receive the first PDSCH via using the TCI-States according to the value of the "Transmission Configuration Indication" field in the first PDCCH regardless of the value of the indicator.

In one embodiment, if TCI-PresentInDCI is set as "Disabled" for the scheduling CORESET or the second PDSCH is scheduled by a fallback DCI (e.g. DCI format 1_0), the UE could assume that the TCI state for receiving the second PDSCH is identical to the TCI state applied for the scheduling CORESET. The UE could refer to the index of the second reference signal and corresponding QCL type when interpreting the TCI state regardless of the value of the indicator.

In one embodiment, the association between the TCI state applied for the scheduling CORESET and the first reference signal could be configured in the configuration of the first serving cell, e.g. configuration related to cross carrier scheduling (CrossCarrierSchedulingConfig). Alternatively, the association between the TCI state applied for the scheduling CORESET and the first reference signal could be configured in the configuration of the second serving cell, e.g. CORESET configuration of the second serving cell.

Alternative 3 of Embodiment 2

If the indicator indicates "1" or "True" or "Enabled", the TCI state applied for receiving the scheduling CORESET could be associated with index of reference signals transmitted on the second serving cell and corresponding QCL types.

If TCI-PresentInDCI is set as "Disabled" for the scheduling CORESET or the first PDSCH is scheduled by a fallback DCI (e.g. DCI format 1_0), for determining PDSCH antenna port quasi co-location, the UE could assume that the TCI state for receiving the first PDSCH is identical to the TCI state applied for the scheduling CORESET. If TCI-PresentInDCI is set as "Disabled" for the scheduling CORESET or the second PDSCH is scheduled by a fallback DCI (e.g. DCI format 1_0), for determining PDSCH antenna port quasi co-location, the UE could assume that the TCI state for receiving the second PDSCH is identical to the TCI state applied for the scheduling CORESET.

If the indicator indicates "0" or "False" or "Disabled", the TCI state applied for receiving the scheduling CORESET is at least associated with index of a first reference signal and index of a second reference signal and corresponding QCL types. The first reference signal is transmitted on the first serving cell, and the second reference signal is transmitted on the second serving cell.

If TCI-PresentInDCI is set as "Disabled" for the scheduling CORESET or the first PDSCH is scheduled by a fallback DCI (e.g. DCI format 1_0), the UE could receive the first PDSCH via PDSCH antenna port quasi co-location derived from the index of the first reference signal and corresponding QCL type. If TCI-PresentInDCI is set as "Disabled" for the scheduling CORESET or the second PDSCH is scheduled by a fallback DCI (e.g. DCI format 1_0), the UE could receive the first PDSCH via PDSCH antenna port quasi co-location derived from the index of the second reference signal and corresponding QCL type.

In one embodiment, if TCI-PresentInDCI is set as "Enabled" for the scheduling CORESET, for determining PDSCH antenna port quasi co-location, the UE could receive the first PDSCH via using the TCI-States according to the value of the "Transmission Configuration Indication" field in the first PDCCH regardless of the value of the indicator. The opposite result from the value of the indicator may not be precluded.

In one embodiment, the association between the TCI state applied for the scheduling CORESET and the first reference signal could be configured in the configuration of the first serving cell, e.g. configuration related to cross carrier scheduling (CrossCarrierSchedulingConfig). Alternatively, the association between the TCI state applied for the scheduling CORESET and the first reference signal could be configured in the configuration of the second serving cell, e.g. CORESET configuration of the second serving cell.

Alternative 4 of Embodiment 2

If TCI-PresentInDCI is set as "Disabled" for the scheduling CORESET or if the first PDSCH is scheduled by a fallback DCI (e.g. DCI format 1_0), for determining PDSCH antenna port quasi co-location, the UE could assume that the TCI state for the first PDSCH is identical to a default TCI state. If TCI-PresentInDCI is set as "Disabled" for the scheduling CORESET or the first PDSCH is scheduled by a fallback DCI (e.g. DCI format 1_0), for determining PDSCH antenna port quasi co-location, the UE could receive the first PDSCH via the PDSCH antenna port quasi co-location derived from the default TCI state.

The default TCI state could be determined based on an indicator. If the indicator indicates "1" or "True" or "Enabled", the default TCI state is identical to a TCI state applied for the scheduling CORESET. In one embodiment, if the indicator indicates "0" or "False" or "Disabled", the default TCI state is not identical to a TCI state applied for the scheduling CORESET.

In one embodiment, if TCI-PresentInDCI is set as "Enabled" for the scheduling CORESET, for determining PDSCH antenna port quasi co-location, the UE could receive the first PDSCH via using the TCI-States according to the value of the "Transmission Configuration Indication" field in the first PDCCH regardless of the value of the indicator. If TCI-PresentInDCI is set as "Disabled" for the scheduling CORESET or the second PDSCH is scheduled by a fallback DCI (e.g. DCI format 1_0), the UE could assume that the TCI state for receiving the second PDSCH is identical to the TCI state applied for the scheduling CORESET regardless of the value of the indicator.

In one embodiment, if the indicator indicates "0" or "False" or "Disabled", the default TCI state could be one of TCI states in the activated TCI states for receiving PDSCH in the first serving cell, or a TCI state mapped to one of codepoints in the TCI field for receiving PDSCH in the first serving cell, or a TCI state with the lowest TCI state ID in the activated TCI states for receiving PDSCH in the first serving cell, or a TCI state mapped to codepoint 0 in the TCI field for receiving PDSCH in the first serving cell, or a TCI state applied for receiving at least one of CORESETs configured for or monitored in the first serving cell and/or the second serving cell, or a TCI state applied for receiving the CORESET with the lowest CORESET ID among the CORESETs configured for or monitored in the first serving cell and/or the second serving cell. In one embodiment, the opposite result from the value of the indicator may not precluded.

Figure 6:
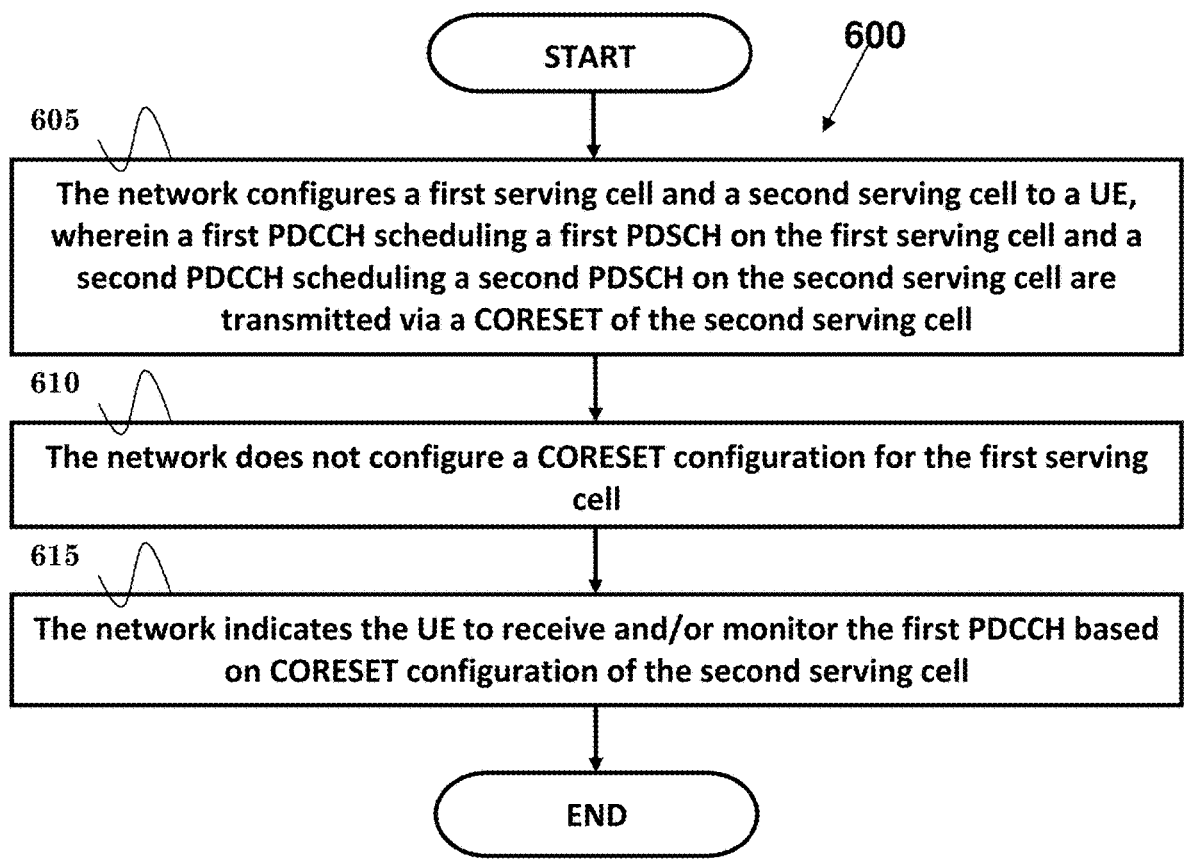
FIG. 6 a flow chart according to one exemplary embodiment.

FIG. 6 is a flow chart 600 according to one exemplary embodiment from the perspective of a network. In step 605, the network configures a first serving cell and a second serving cell to a UE, wherein a first PDCCH scheduling a first PDSCH on the first serving cell and a second PDCCH scheduling a second PDSCH on the second serving cell are transmitted via a CORESET of the second serving cell. In step 610, the network does not configure a CORESET configuration for the first serving cell. In step 615, the network indicates the UE to receive and/or monitor the first PDCCH based on CORESET configuration of the second serving cell.

In one embodiment, the CORESET configuration could indicate a CORESET transmitted in the second serving cell.

In one embodiment, the first serving cell could be a scheduled serving cell, and the second serving cell could also be a scheduling serving cell.

In one embodiment, the network could transmit the second PDSCH via a first TCI state applied for the CORESET of the second serving cell, if TCI-PresentInDCI is not set as "Enabled" for the CORESET of the second serving cell or if the second PDSCH is scheduled by a first fallback DCI (Downlink Control Information). The network could transmit the first PDSCH via a second TCI state, wherein the second TCI state is not applied for the CORESET of the second serving cell, if TCI-PresentInDCI is not set as "Enabled" for the CORESET of the second serving cell or if the first PDSCH is scheduled by a second fallback DCI.

In one embodiment, the second TCI state could comprise the lowest TCI state ID (Identity) in activated TCI states for receiving PDSCH in the first serving cell, a TCI state mapped to one of codepoints in TCI field for receiving PDSCH in the first serving cell, a TCI state applied for at least one of CORESETs configured for or monitored in the first serving cell, or a TCI state applied for the CORESET with the lowest CORESET ID among at least one of CORESETs configured for or monitored in the first serving cell.

Referring back to FIGS. 3 and 4, in one exemplary embodiment of a network, the device 300 includes a program code 312 stored in the memory 310. The CPU 308 could execute program code 312 to enable the network (i) to configure a first serving cell and a second serving cell to a UE, wherein a first PDCCH scheduling a first PDSCH on the first serving cell and a second PDCCH scheduling a second PDSCH on the second serving cell are transmitted via a CORESET of the second serving cell, (ii) to not configure a CORESET configuration for the first serving cell, (iii) to indicate the UE to receive and/or monitor the first PDCCH based on CORESET configuration of the second serving cell. Furthermore, the CPU 308 can execute the program code 312 to perform all of the above-described actions and steps or others described herein.

Figure 7:
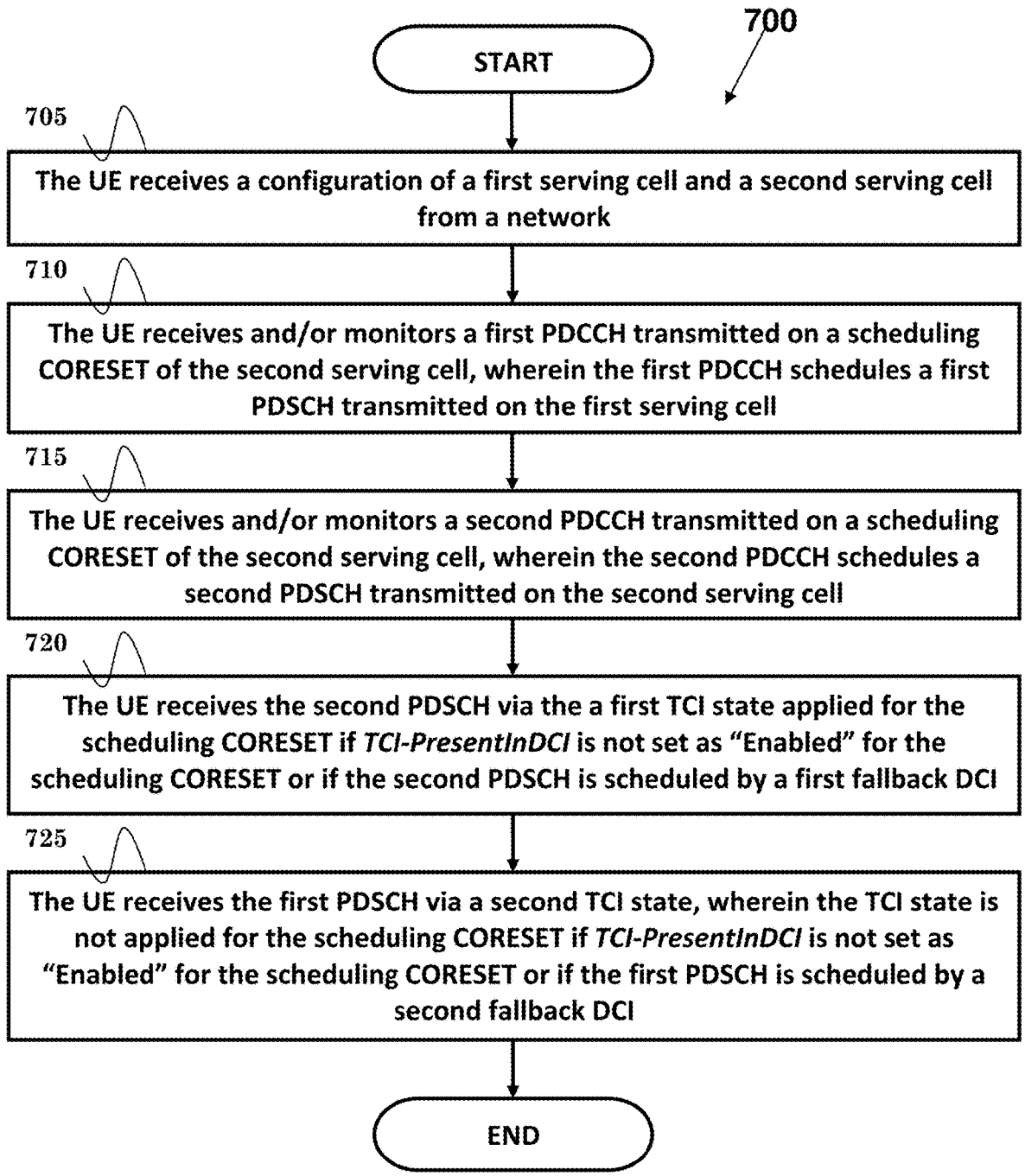
FIG. 7 is a flow chart according to one exemplary embodiment.

FIG. 7 is a flow chart 700 according to one exemplary embodiment from the perspective of a UE. In step 705, the UE receives a configuration of a first serving cell and a second serving cell from a network. In step 710, the UE receives and/or monitors a first PDCCH transmitted on a scheduling CORESET of the second serving cell, wherein the first PDCCH schedules a first PDSCH transmitted on the first serving cell. In step 715, the UE receives and/or monitors a second PDCCH transmitted on the scheduling CORESET of the second serving cell, wherein the second PDCCH schedules a second PDSCH transmitted on the second serving cell. In step 720, the UE receives the second PDSCH via a first TCI (Transmission Configuration Indication) state applied for the scheduling CORESET if TCI-PresentInDCI is not set as "Enabled" for the scheduling CORESET or if the second PDSCH is scheduled by a first fallback DCI (Downlink Control Information). In step 725, the UE receives the first PDSCH via a second TCI state, wherein the TCI state is not applied for the scheduling CORESET if TCI-PresentInDCI is not set as "Enabled" for the scheduling CORESET or if the first PDSCH is scheduled by a second fallback DCI.

In one embodiment, the network could not configure a CORESET configuration for the first serving cell. The network could indicate the UE to receive and/or monitor the first PDCCH based on CORESET configuration of the second serving cell. The CORESET configuration could indicate a CORESET transmitted in the second serving cell.

In one embodiment, the second TCI state could be a TCI state comprising the lowest TCI state ID (Identity) in activated TCI states for receiving PDSCH in the first serving cell, a TCI state mapped to a codepoint in TCI field for receiving PDSCH in the first serving cell, a TCI state applied for at least one of CORESETs configured for or monitored in the first serving cell, or a TCI state applied for the CORESET with the lowest CORESET ID (Identity) among the CORESETs configured for or monitored in the first serving cell. In one embodiment, the UE could receive the first PDSCH via the PDSCH antenna port quasi co-location derived from the second TCI state.

In one embodiment, the first fallback DCI and the second fallback DCI do not or could not include a TCI field. Additionally or alternatively, the first fallback DCI and the second fallback DCI could be DCI format 1_0.

In one embodiment, if the network configures a CORESET configuration for the first serving cell and a parameter providing quasi co-location information is configured in the CORESET configuration for the first serving cell, the UE may ignore or not use the parameter providing quasi co-location information for receiving PDCCH of the first serving cell. The first serving cell could be a scheduled serving cell. The second serving cell could also be a scheduling serving cell.

Referring back to FIGS. 3 and 4, in one exemplary embodiment of a UE, the device 300 includes a program code 312 stored in the memory 310. The CPU 308 could execute program code 312 to enable the UE (i) to receive a configuration of a first serving cell and a second serving cell from a network, (ii) to receive and/or monitor a first PDCCH transmitted on a scheduling CORESET of the second serving cell, wherein the first PDCCH schedules a first PDSCH transmitted on the first serving cell, (iii) to receive and/or monitor a second PDCCH transmitted on the scheduling CORESET of the second serving cell, wherein the second PDCCH schedules a second PDSCH transmitted on the second serving cell, (iv) to receive the second PDSCH via a first TCI state applied for receiving the scheduling CORESET, if TCI-PresentInDCI is not set as "Enabled" for the scheduling CORESET or if the second PDSCH is scheduled by a first fallback DCI, and (v) to receive the first PDSCH via a second TCI state, wherein the second TCI state is not applied for the scheduling CORESET, if TCI-PresentInDCI is not set as "Enabled" for the scheduling CORESET or if the first PDSCH is scheduled by a second fallback DCI. Furthermore, the CPU 308 can execute the program code 312 to perform all of the above-described actions and steps or others described herein.

Figure 8:
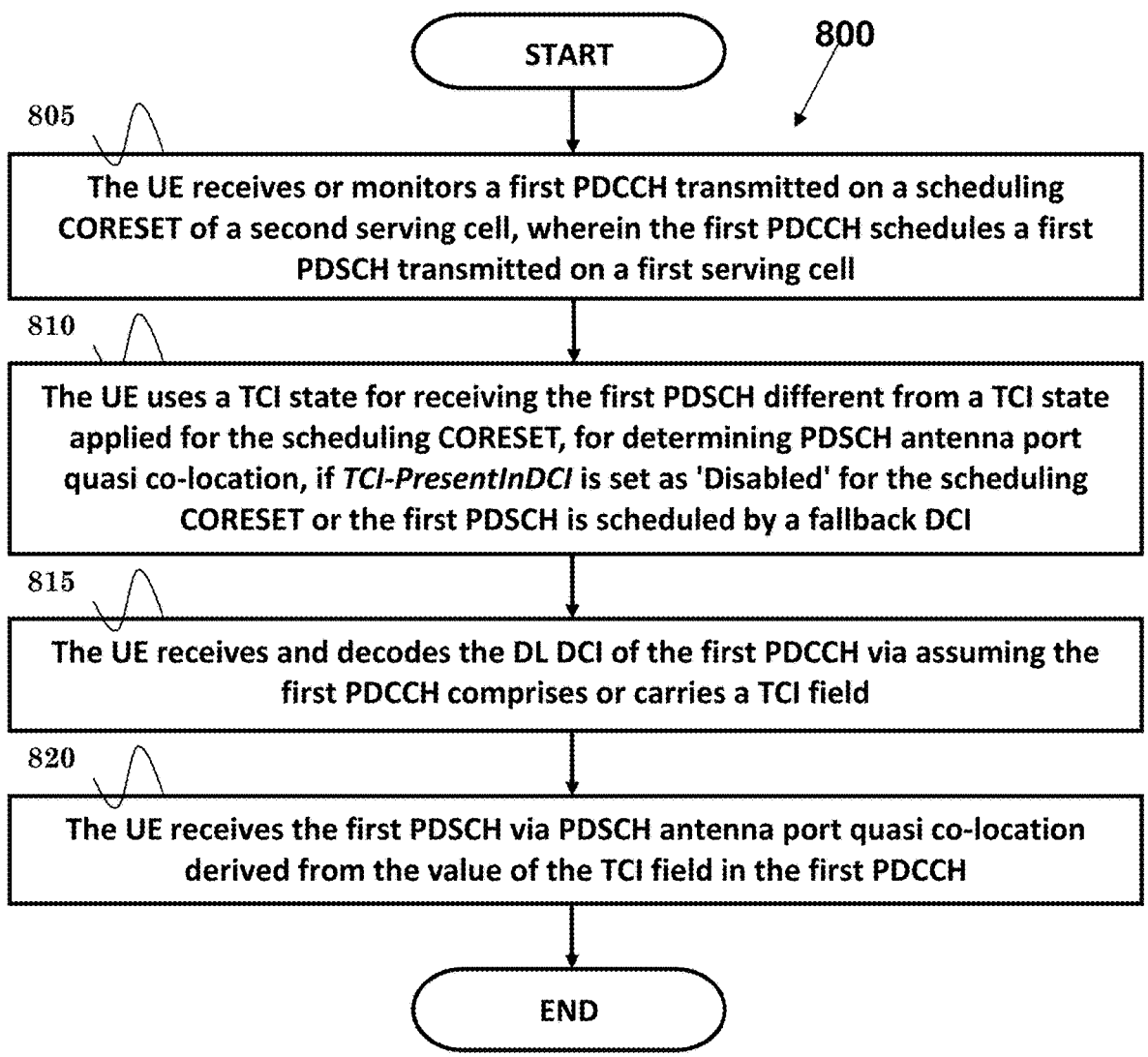
FIG. 8 is a flow chart according to one exemplary embodiment.

FIG. 8 is a flow chart 800 according to one exemplary embodiment from the perspective of a UE, wherein the UE is served or configured with a first serving cell and a second serving cell. In step 805, the UE receives or monitors a first PDCCH transmitted on a scheduling CORESET of the second serving cell, wherein the first PDCCH schedules a first PDSCH transmitted on the first serving cell. In step 810, the UE uses a TCI state for receiving the first PDSCH different from a TCI state applied for the scheduling CORESET, for determining PDSCH antenna port quasi co-location, if TCI-PresentInDCI is set as 'Disabled' for the scheduling CORESET or the first PDSCH is scheduled by a fallback DCI (e.g. DCI format 1_0). In step 815, the UE receives and decodes the DL DCI of the first PDCCH via assuming the first PDCCH comprises or carries a TCI field. In step 820, the UE receives the first PDSCH via PDSCH antenna port quasi co-location derived from the value of the TCI field in the first PDCCH.

In one embodiment, the UE could assume the DL DCI of the first PDCCH comprises or carries a TCI field. Furthermore, the UE could use the TCI-States according to the value of the TCI field in the first PDCCH for determining PDSCH antenna port quasi co-location.

In on embodiment, if TCI-PresentInDCI is set as 'Disabled' for the scheduling CORESET or the first PDSCH is scheduled by a fallback DCI (e.g. DCI format 1_0), the UE could assume that the DL DCI of the first PDCCH comprises or carries a TCI field regardless of that TCI-PresentInDCI is set as 'Disabled' for the scheduling CORESET or the first PDSCH is scheduled by a fallback DCI (e.g. DCI format 1_0). The UE could use the TCI-States according to the value of a TCI field in the first PDCCH for determining PDSCH antenna port quasi co-location.

Referring back to FIGS. 3 and 4, in one exemplary embodiment of a UE, wherein the UE is served or configured with a first serving cell and a second serving cell, the device 300 includes a program code 312 stored in the memory 310. The CPU 308 could execute program code 312 to enable the UE (i) to receive or monitor a first PDCCH transmitted on a scheduling CORESET of the second serving cell, wherein the first PDCCH schedules the first PDSCH transmitted on a first serving cell, (ii) to use a TCI state for receiving the first PDSCH different from a TCI state applied for the scheduling CORESET, for determining PDSCH antenna port quasi co-location, if TCI-PresentInDCI is set as 'Disabled' for the scheduling CORESET or the first PDSCH is scheduled by a fallback DCI, (iii) to receive and decode the DL DCI of the first PDCCH via assuming the first PDCCH comprises or carries a TCI field, and (iv) to receive the first PDSCH via PDSCH antenna port quasi co-location derived from the value of the TCI field in the first PDCCH. Furthermore, the CPU 308 can execute the program code 312 to perform all of the above-described actions and steps or others described herein.

Figure 9:
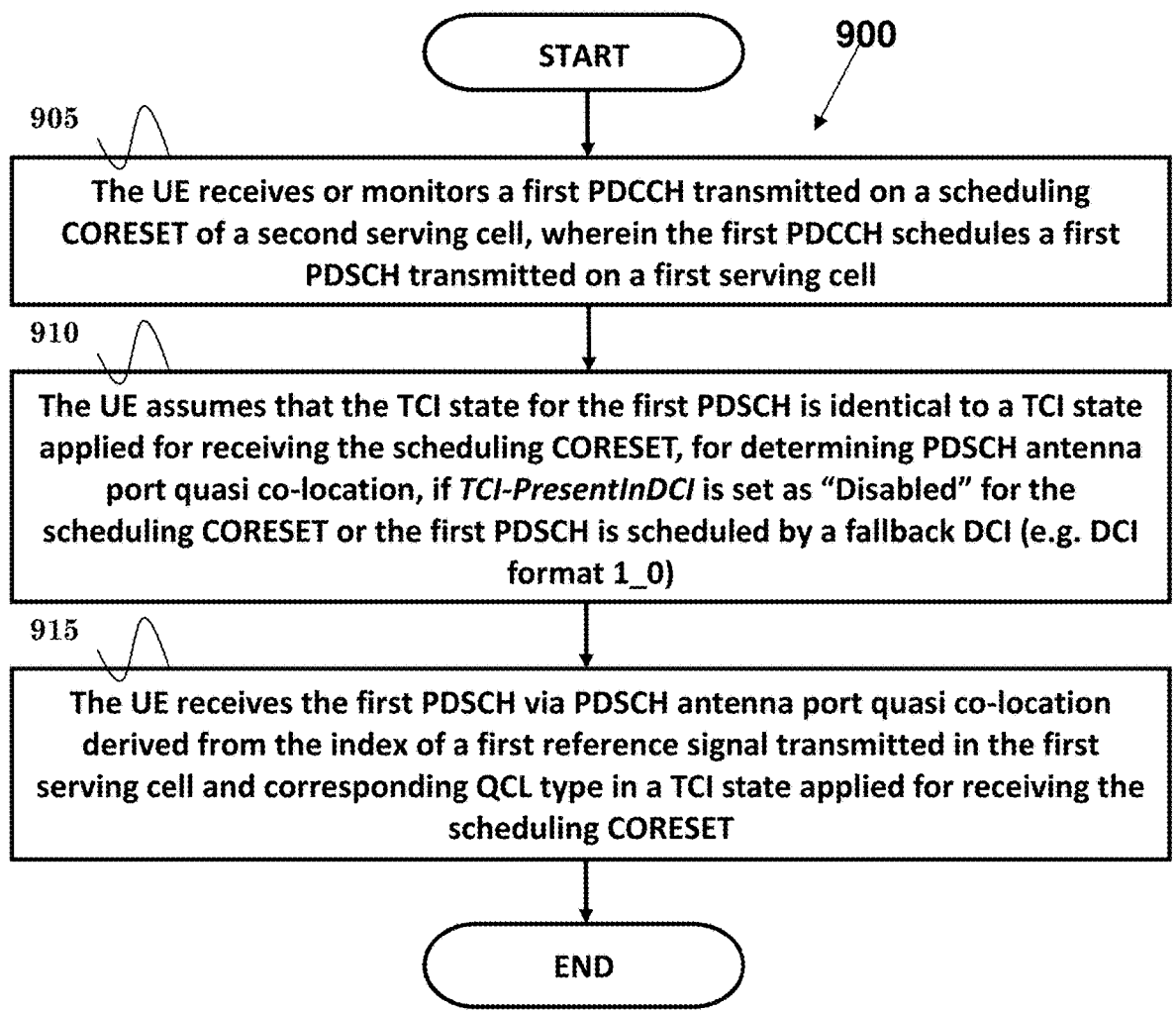
FIG. 9 is a flow chart according to one exemplary embodiment.

FIG. 9 is a flow chart 900 according to one exemplary embodiment from the perspective of a UE, wherein the UE is served or configured with a first serving cell and a second serving cell. In step 905, the UE receives or monitors a first PDCCH transmitted on a scheduling CORESET of the second serving cell, wherein the first PDCCH schedules a first PDSCH transmitted on the first serving cell. In step 910, the UE assumes that the TCI state for the first PDSCH is identical to a TCI state applied for receiving the scheduling CORESET, for determining PDSCH antenna port quasi co-location, if TCI-PresentInDCI is set as "Disabled" for the scheduling CORESET or the first PDSCH is scheduled by a fallback DCI (e.g. DCI format 1_0). In step 915, the UE receives the first PDSCH via PDSCH antenna port quasi co-location derived from the index of a first reference signal transmitted in the first serving cell and corresponding QCL type in a TCI state applied for receiving the scheduling CORESET.

In one embodiment, the UE could receive or monitor a second PDCCH transmitted on the scheduling CORESET, wherein the second PDCCH schedules a second PDSCH transmitted on the second serving cell.

In one embodiment, the TCI state applied for receiving the scheduling CORESET could be at least associated with index of the first reference signals and index of the second reference signal and corresponding QCL types. The first reference signal could be transmitted on the first serving cell. The second reference signal could be transmitted on the second serving cell.

In one embodiment, the association between a TCI state applied for the scheduling CORESET and the first reference signal is configured in the configuration of the first serving cell, e.g. configuration related to cross carrier scheduling (CrossCarrierSchedulingConfig). Alternatively, the association between a TCI state applied for the scheduling CORESET and the first reference signal could be configured in the configuration of the second serving cell, e.g. CORESET configuration of the second serving cell.

Referring back to FIGS. 3 and 4, in one exemplary embodiment of a UE, wherein the UE is served and/or configured with a first serving cell and a second serving cell, the device 300 includes a program code 312 stored in the memory 310. The CPU 308 could execute program code 312 to enable the UE (i) to receive or monitor a first PDCCH transmitted on a scheduling CORESET of the second serving cell, wherein the first PDCCH schedules a first PDSCH transmitted on the first serving cell, (ii) to assume that the TCI state for the first PDSCH is identical to a TCI state applied for receiving the scheduling CORESET, for determining PDSCH antenna port quasi co-location, if TCI-PresentInDCI is set as "Disabled" for the scheduling CORESET or the first PDSCH is scheduled by a fallback DCI, and (iii) to receive the first PDSCH via PDSCH antenna port quasi co-location derived from the index of a first reference signal transmitted in the first serving cell and corresponding QCL type in a TCI state applied for receiving the scheduling CORESET. Furthermore, the CPU 308 can execute the program code 312 to perform all of the above-described actions and steps or others described herein.

Figure 10:
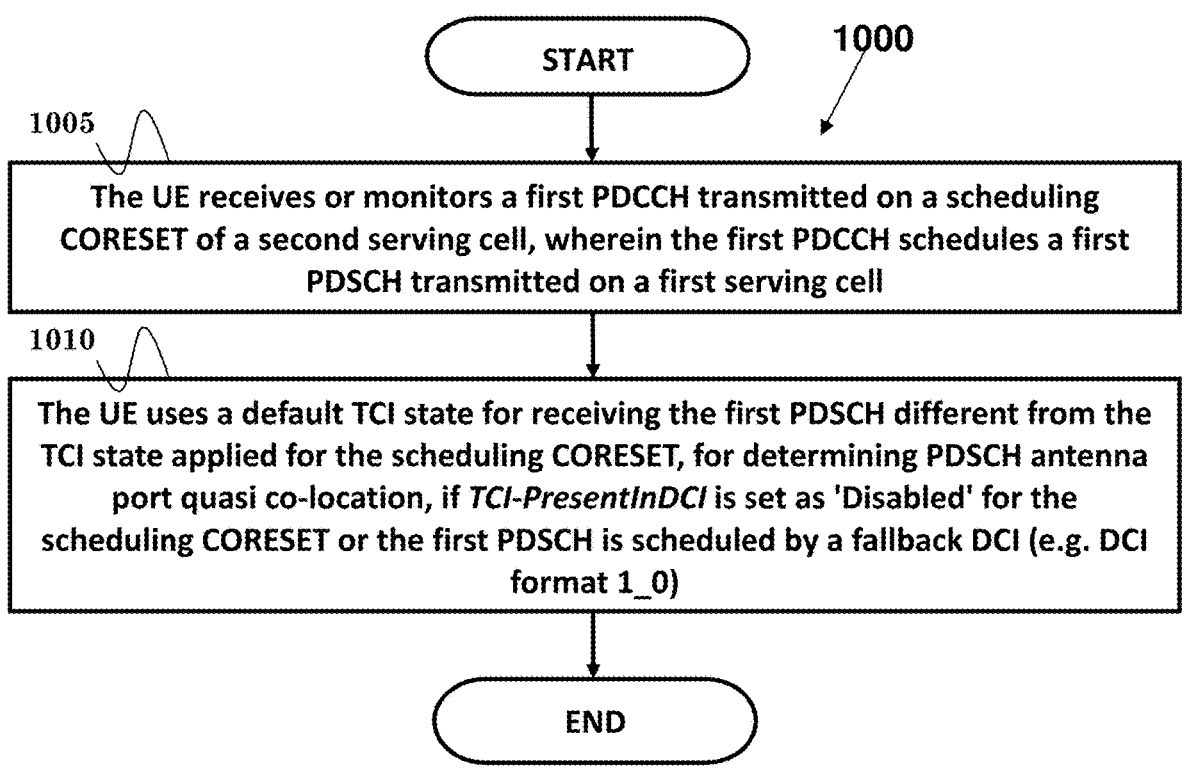
FIG. 10 is a flow chart according to one exemplary embodiment.

FIG. 10 is a flow chart 1000 according to one exemplary embodiment from the perspective of a UE, wherein the UE is served or configured with a first serving cell and a second serving cell. In step 1005, the UE receives or monitors a first PDCCH transmitted on a scheduling CORESET of the second serving cell, wherein the first PDCCH schedules a first PDSCH transmitted on the first serving cell. In step 1010, the UE uses a default TCI state for receiving the first PDSCH, wherein the default beam is different from a TCI state applied for the scheduling CORESET, for determining PDSCH antenna port quasi co-location, if TCI-PresentIn-DCI is set as "Disabled" or not set as "Enabled" for the scheduling CORESET or the first PDSCH is scheduled by a fallback DCI (e.g. DCI format 1_0).

In one embodiment, the default TCI state could be one of TCI states in the activated TCI states for receiving PDSCH in the first serving cell. More specifically, the default TCI state could be a TCI state mapped to one of codeponints in the TCI field for receiving PDSCH in the first serving cell, a TCI state with the lowest TCI state ID in the activated TCI states for receiving PDSCH in the first serving cell, a TCI state with the lowest TCI state ID in the configured TCI states for receiving at least downlink transmission in the first serving cell, a TCI state mapped to codepoint 0 in the TCI field for receiving PDSCH in the first serving cell, a TCI state applied for receiving at least one of CORESETs configured for or monitored in the first serving cell and/or the second serving cell, or a TCI state applied for receiving the CORESET with the lowest CORESET ID among the CORESETs configured for or monitored in the first serving cell and/or the second serving cell.

Referring back to FIGS. 3 and 4, in one exemplary embodiment of a UE, wherein the UE is served and/or configured with a first serving cell and a second serving cell, the device 300 includes a program code 312 stored in the memory 310. The CPU 308 could execute program code 312 to enable the UE (i) to receive or monitor a first PDCCH transmitted on a scheduling CORESET of the second serving cell, wherein the first PDCCH schedules a first PDSCH transmitted on the first serving cell, and (ii) to use a default TCI state for receiving the first PDSCH, wherein the default beam is different from a TCI state applied for the scheduling CORESET, for determining PDSCH antenna port quasi co-location, if TCI-PresentInDCI is set as "Disabled" or not set as "Enabled" for the scheduling CORESET or the first PDSCH is scheduled by a fallback DCI. Furthermore, the CPU 308 can execute the program code 312 to perform all of the above-described actions and steps or others described herein.

Figure 11:
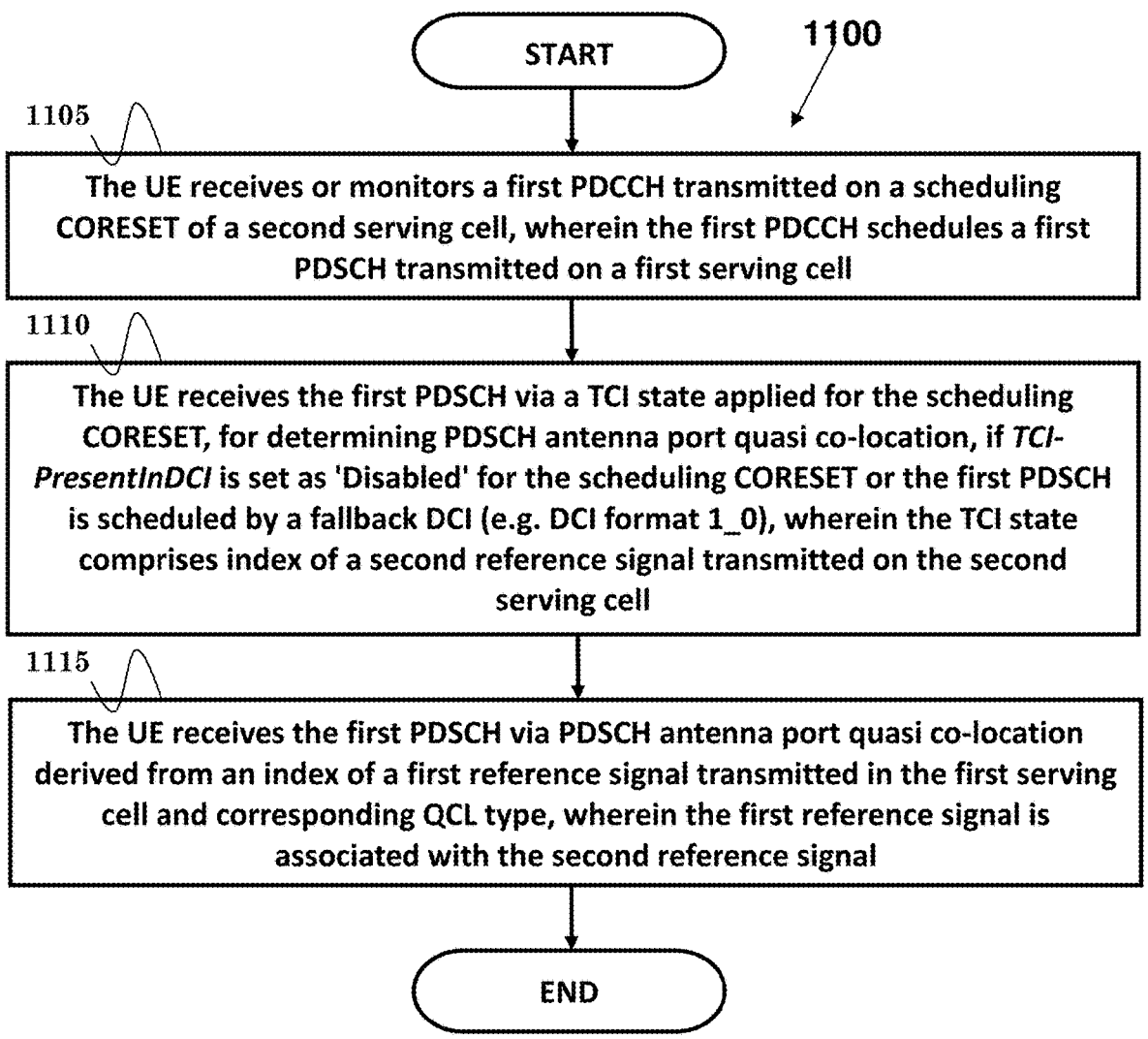
FIG. 11 is a flow chart according to one exemplary embodiment.

FIG. 11 is a flow chart 1100 according to one exemplary embodiment from the perspective of a UE, wherein the UE is served or configured with a first serving cell and a second serving cell. In step 1105, the UE receives or monitors a first PDCCH transmitted on a scheduling CORESET of the second serving cell, wherein the first PDCCH schedules a first PDSCH transmitted on the first serving cell. In step 1110, the UE receives the first PDSCH via a TCI state applied for the scheduling CORESET, for determining PDSCH antenna port quasi co-location, if TCI-PresentInDCI is set as "Disabled" for the scheduling CORESET or the first PDSCH is scheduled by a fallback DCI (e.g. DCI format 1_0), wherein the TCI state comprises index of a second reference signal transmitted on the second serving cell. In step 1115, the UE receives the first PDSCH via PDSCH antenna port quasi co-location derived from an index of a first reference signal transmitted in the first serving cell and corresponding QCL type, wherein the first reference signal is associated with the second reference signal.

In one embodiment, the association between the first reference signal and the second reference signal could be (explicitly) configured to the UE, specified to the UE (e.g. specified in the specification), or (implicitly) derived by the UE. In particular, the association between the first reference signal and the second reference signal could be (implicitly) derived by the UE via a rule, e.g. the index number of the first reference signal and the second reference signal.

Referring back to FIGS. 3 and 4, in one exemplary embodiment of a UE, wherein the UE is served and/or configured with a first serving cell and a second serving cell, the device 300 includes a program code 312 stored in the memory 310. The CPU 308 could execute program code 312 to enable the UE (i) to receive or monitor a first PDCCH transmitted on a scheduling CORESET of the second serving cell, wherein the first PDCCH schedules a first PDSCH transmitted on the first serving cell, (ii) to receive the first PDSCH via a TCI state applied for the scheduling CORESET, for determining PDSCH antenna port quasi co-location, if TCI-PresentInDCI is set as 'Disabled' for the scheduling CORESET or the first PDSCH is scheduled by a fallback DCI (e.g. DCI format 1_0), wherein the TCI state comprises index of a second reference signal transmitted on the second serving cell, and (iii) to receive the first PDSCH via PDSCH antenna port quasi co-location derived from an index of a first reference signal transmitted in the first serving cell and corresponding QCL type, wherein the first reference signal is associated with the second reference signal. Furthermore, the CPU 308 can execute the program code 312 to perform all of the above-described actions and steps or others described herein.

Figure 12:
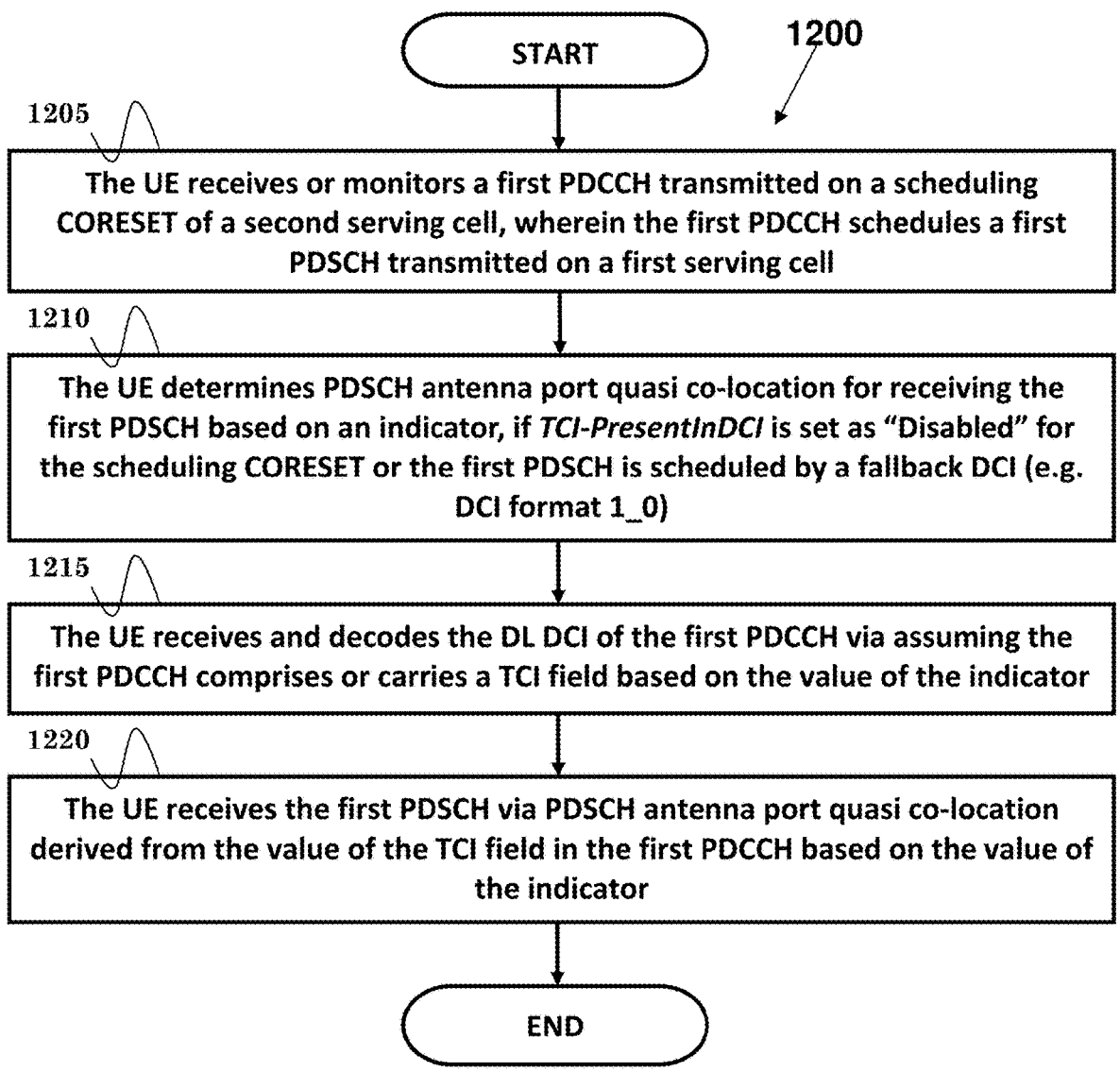
FIG. 12 is a flow chart according to one exemplary embodiment.

FIG. 12 is a flow chart 1200 according to one exemplary embodiment from the perspective of a UE, wherein the UE is served or configured with a first serving cell and a second serving cell. In step 1205, the UE receives or monitors a first PDCCH transmitted on a scheduling CORESET of the second serving cell, wherein the first PDCCH schedules a first PDSCH transmitted on the first serving cell. In step 1210, the UE determines PDSCH antenna port quasi co-location for receiving the first PDSCH based on an indicator, if TCI-PresentInDCI is set as "Disabled" for the scheduling CORESET or the first PDSCH is scheduled by a fallback DCI (e.g. DCI format 1_0). In step 1215, the UE receives and decodes the DL DCI of the first PDCCH via assuming the first PDCCH comprises or carries a TCI field based on the value of the indicator. In step 1220, the UE receives the first PDSCH via PDSCH antenna port quasi co-location derived from the value of the TCI field in the first PDCCH based on the value of the indicator.

In one embodiment, if the indicator indicates "1" or "True" or "Enabled" and if TCI-PresentInDCI is set as "Disabled" for the scheduling CORESET or the first PDSCH is scheduled by a fallback DCI (e.g. DCI format 1_0), for determining PDSCH antenna port quasi co-location, the UE could assume that the TCI state for the first PDSCH is identical to a TCI state applied for the scheduling CORESET. However, if the indicator indicates "0" or "False" or "Disabled" and if TCI-PresentInDCI is set as "Disabled" for the scheduling CORESET or the first PDSCH is scheduled by a fallback DCI (e.g. DCI format 1_0), the UE could assume that the DL DCI of the first PDCCH comprises or carries a TCI field regardless of that TCI-PresentInDCI is set as "Disabled" for the scheduling CORESET or the first PDSCH is scheduled by a fallback DCI (e.g. DCI format 1_0).

In one embodiment, the UE could use the TCI-States according to the value of the TCI field in the first PDCCH for determining PDSCH antenna port quasi co-location. Furthermore, the UE could receive or monitor a second PDCCH transmitted on the scheduling CORESET, wherein the second PDCCH schedules a second PDSCH transmitted on the second serving cell.

In one embodiment, if TCI-PresentInDCI is set as "Disabled" for the scheduling CORESET or the second PDSCH is scheduled by a fallback DCI (e.g. DCI format 1_0), the UE could assume that the TCI state for the first PDSCH is identical to a TCI state applied for the scheduling CORESET regardless of the value of the indicator.

Referring back to FIGS. 3 and 4, in one exemplary embodiment of a UE, wherein the UE is served and/or configured with a first serving cell and a second serving cell, the device 300 includes a program code 312 stored in the memory 310. The CPU 308 could execute program code 312 to enable the UE (i) to receive or monitor a first PDCCH transmitted on a scheduling CORESET of the second serving cell, wherein the first PDCCH schedules a first PDSCH transmitted on the first serving cell, (ii) to determine PDSCH antenna port quasi co-location for receiving the first PDSCH based on an indicator, if TCI-PresentInDCI is set as "Disabled" for the scheduling CORESET or the first PDSCH is scheduled by a fallback DCI (e.g. DCI format 1_0), (iii) to receive and decode the DL DCI of the first PDCCH via assuming the first PDCCH comprises or carries a TCI field based on the value of the indicator, and (iv) to receive the first PDSCH via PDSCH antenna port quasi co-location derived from the value of the TCI field in the first PDCCH based on the value of the indicator. Furthermore, the CPU 308 can execute the program code 312 to perform all of the above-described actions and steps or others described herein.

Figure 13:
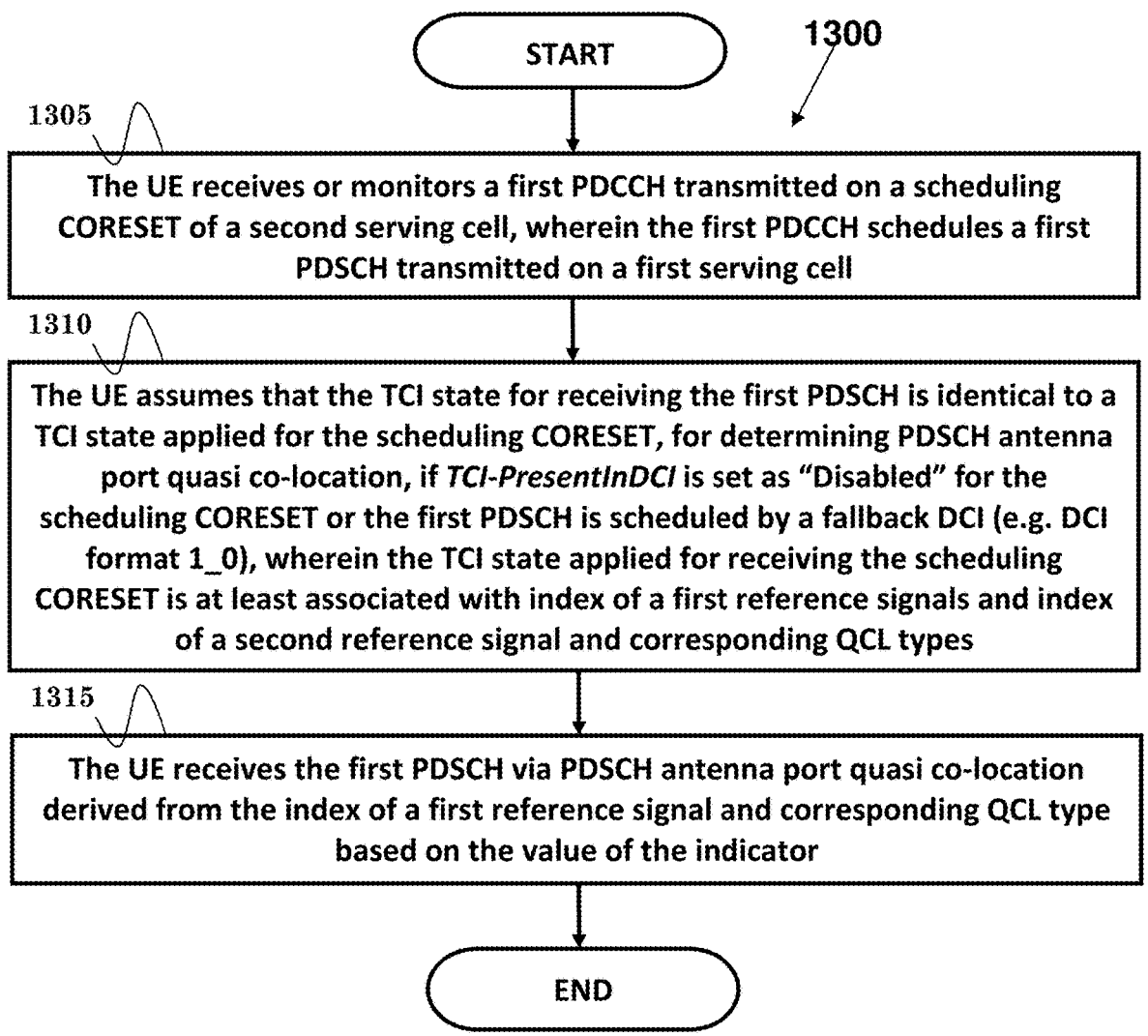
FIG. 13 is a flow chart according to one exemplary embodiment.

FIG. 13 is a flow chart 1300 according to one exemplary embodiment from the perspective of a UE, wherein the UE is served or configured with a first serving cell and a second serving cell. In step 1305, the UE receives or monitors a first PDCCH transmitted on a scheduling CORESET of the second serving cell, wherein the first PDCCH schedules a first PDSCH transmitted on the first serving cell. In step 1310, the UE assumes that the TCI state for receiving the first PDSCH is identical to a TCI state applied for the scheduling CORESET, for determining PDSCH antenna port quasi co-location, if TCI-PresentInDCI is set as "Disabled" for the scheduling CORESET or the first PDSCH is scheduled by a fallback DCI (e.g. DCI format 1_0), wherein the TCI state applied for receiving the scheduling CORESET is at least associated with index of a first reference signals and index of a second reference signal and corresponding QCL types. In step 1315, the UE receives the first PDSCH via PDSCH antenna port quasi co-location derived from the index of a first reference signal and corresponding QCL type based on the value of the indicator.

In one embodiment, the UE could receive or monitor a second PDCCH transmitted on the scheduling CORESET, wherein the second PDCCH schedules a second PDSCH transmitted on the second serving cell. The UE could also interpret the TCI state applied for the scheduling CORESET based on an indicator.

In one embodiment, the first reference signal could be transmitted on the first serving cell. The second reference signal could also transmitted on the second serving cell.

In one embodiment, the association between the TCI state applied for the scheduling CORESET and the first reference signal could be configured in the configuration of the first serving cell, e.g. configuration related to cross carrier scheduling (CrossCarrierSchedulingConfig). The association between the TCI state applied for the scheduling CORESET and the first reference signal could also be configured in the configuration of the second serving cell, e.g. CORESET configuration of the second serving cell.

In one embodiment, if the indicator indicates "1" or "True" or "Enabled", the UE could refer to the index of the second reference signal and corresponding QCL type when interpreting the TCI state applied for the scheduling CORESET. However, if the indicator indicates "0" or "False" or "Disabled", the UE could refer to the index of the first reference signal and corresponding QCL type when interpreting the TCI state applied for the scheduling CORESET.

In one embodiment, if the indicator indicates "1" or "True" or "Enabled", the TCI state applied for receiving the scheduling CORESET could be associated with index of reference signals transmitted on the second serving cell and corresponding QCL types. However, if the indicator indicates "0" or "False"' or "Disabled", the TCI state applied for receiving the scheduling CORESET could be at least associated with index of a first reference signal and index of a second reference signal and corresponding QCL types.

Referring back to FIGS. 3 and 4, in one exemplary embodiment of a UE, wherein the UE is served and/or configured with a first serving cell and a second serving cell, the device 300 includes a program code 312 stored in the memory 310. The CPU 308 could execute program code 312 to enable the UE (i) to receive or monitor a first PDCCH transmitted on a scheduling CORESET of the second serving cell, wherein the first PDCCH schedules a first PDSCH transmitted on the first serving cell, (ii) to assume that the TCI state for receiving the first PDSCH is identical to a TCI state applied for the scheduling CORESET, for determining PDSCH antenna port quasi co-location, if TCI-PresentInDCI is set as 'Disabled' for the scheduling CORESET or the first PDSCH is scheduled by a fallback DCI, wherein the TCI state applied for receiving the scheduling CORESET is at least associated with index of a first reference signals and index of a second reference signal and corresponding QCL types, and (iii) to receive the first PDSCH via PDSCH antenna port quasi co-location derived from the index of a first reference signal and corresponding QCL type based on the value of the indicator. Furthermore, the CPU 308 can execute the program code 312 to perform all of the above-described actions and steps or others described herein.

Figure 14:
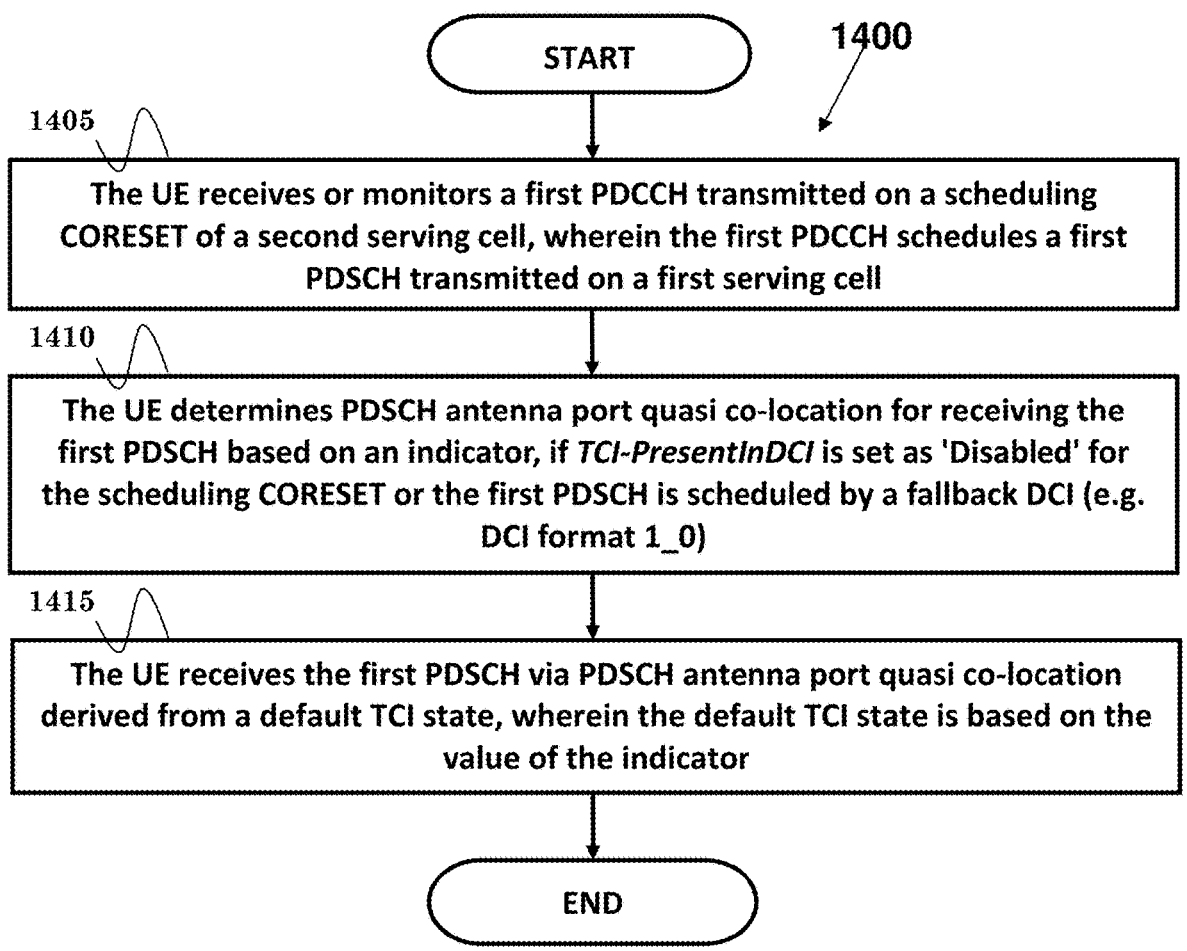
FIG. 14 is a flow chart according to one exemplary embodiment.

FIG. 14 is a flow chart 1400 according to one exemplary embodiment from the perspective of a UE, wherein the UE is served or configured with a first serving cell and a second serving cell. In step 1405, the UE receives or monitors a first PDCCH transmitted on a scheduling CORESET of the second serving cell, wherein the first PDCCH schedules a first PDSCH transmitted on the first serving cell. In step 1410, the UE determines PDSCH antenna port quasi co-location for receiving the first PDSCH based on an indicator, if TCI-PresentInDCI is set as "Disabled" for the scheduling CORESET or the first PDSCH is scheduled by a fallback DCI (e.g. DCI format 1_0). In step 1415, the UE receives the first PDSCH via PDSCH antenna port quasi co-location derived from a default TCI state, wherein the default TCI state is based on the value of the indicator.

In one embodiment, if the indicator indicates "1" or "True" or "Enabled", the UE could assume that the default TCI state is identical to a TCI state applied for the scheduling CORESET. However, if the indicator indicates "0" or "False" or "Disabled", the UE could assume that the default TCI state is not identical to the default TCI state.

In one embodiment, if the indicator indicates "0" or "False" or "Disabled", the default TCI state could be a TCI state mapped to one of codeponints in the TCI field for receiving PDSCH in the first serving cell. More specifically, if the indicator indicates "0" or "False" or "Disabled", the default TCI state could be a TCI state with the lowest TCI state ID in the activated TCI states for receiving PDSCH in the first serving cell, a TCI state mapped to codepoint 0 in the TCI field for receiving PDSCH in the first serving cell, a TCI state applied for receiving at least one of CORESETs configured for the first serving cell and/or the second serving cell, or a TCI state applied for receiving the CORESET with the lowest CORESET ID among the CORESETs configured for the first serving cell and/or the second serving cell.

In one embodiment, if TCI-PresentInDCI is set as "Disabled" for the scheduling CORESET or the second PDSCH is scheduled by a fallback DCI (e.g. DCI format 1_0), for determining PDSCH antenna port quasi co-location, the UE could assume the TCI state for receiving the second PDSCH is identical to the TCI state applied for the scheduling CORESET.

Referring back to FIGS. 3 and 4, in one exemplary embodiment of a UE, wherein the UE is served and/or configured with a first serving cell and a second serving cell, the device 300 includes a program code 312 stored in the memory 310. The CPU 308 could execute program code 312 to enable the UE (i) to receive or monitor a first PDCCH transmitted on a scheduling CORESET of the second serving cell, wherein the first PDCCH schedules a first PDSCH transmitted on the first serving cell, (ii) to determine PDSCH antenna port quasi co-location for receiving the first PDSCH based on an indicator, if TCI-PresentInDCI is set as 'Disabled' for the scheduling CORESET or the first PDSCH is scheduled by a fallback DCI (e.g. DCI format 1_0), and (iii) to receive the first PDSCH via PDSCH antenna port quasi co-location derived from a default TCI state, wherein the default TCI state is based on the value of the indicator. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network, comprising:
   the network configures a first serving cell and a second serving cell to a UE (User Equipment), wherein a first PDCCH (Physical Downlink Control Channel) scheduling a first PDSCH (Physical Downlink Shared Channel) on the first serving cell and a second PDCCH scheduling a second PDSCH on the second serving cell are transmitted on the second serving cell;
   the network transmits the second PDSCH via a first TCI (Transmission Configuration Indication) state applied for a CORESET (Control Resource Set) of the second serving cell where the second PDCCH is transmitted when a TCI field is not present in a second DCI (Downlink Control Information) of the second PDCCH; and
   the network transmits the first PDSCH via a second TCI state, wherein the second TCI state comprises the lowest TCI state ID (Identity), when a TCI field is not present in a first DCI of the first PDCCH.

2. The method of claim 1, wherein the CORESET configuration indicates a CORESET transmitted in the second serving cell.

3. The method of claim 1, wherein the first serving cell is a scheduled serving cell, and the second serving cell is a scheduling serving cell.

4. The method of claim 1, wherein the second TCI state is mapped to one of codepoints in TCI field for receiving PDSCH in the first serving cell.

5. The method of claim 1, wherein the second TCI state is applied for at least one of CORESETs configured for or monitored in the first serving cell.

6. A method for a UE (User Equipment), comprising:
   the UE receives a configuration of a first serving cell and a second serving cell from a network;
   the UE receives and/or monitors a first PDCCH (Physical Download Control Channel) transmitted on the second serving cell, wherein the first PDCCH schedules a first PDSCH (Physical Downlink Shared Channel) transmitted on the first serving cell;
   the UE receives and/or monitors a second PDCCH transmitted on the second serving cell, wherein the second PDCCH schedules a second PDSCH transmitted on the second serving cell;
   the UE receives the second PDSCH via a first TCI (Transmission Configuration Indication) state applied for a CORESET (Control Resource Set) where the second PDCCH is transmitted when a TCI field is not present in a second DCI of the second PDCCH; and
   the UE receives the first PDSCH via a second TCI state, wherein the second TCI state comprises the lowest TCI state ID (Identity) in activated TCI states for receiving PDSCH in the first serving cell when a TCI field is not present in a first DCI of the first PDCCH.

7. The method of claim 6, wherein the second TCI state is mapped to one of codepoints in TCI field for receiving PDSCH in the first serving cell.

8. The method of claim 6, wherein the second TCI state is applied for at least one of CORESETs configured for or monitored in the first serving cell.

9. The method of claim 6, wherein the second TCI state is applied for a CORESET with the lowest CORESET ID (Identity) among at least one of CORESETs configured for or monitored in the first serving cell.

10. The method of claim 6, wherein the UE receives the first PDSCH via the PDSCH antenna port quasi co-location derived from the second TCI state.

11. The method of claim 6, wherein the first fallback DCI and the second fallback DCI do not include a TCI field.

12. The method of claim 6, wherein the first fallback DCI and the second fallback DCI are DCI format 1_0.

13. The method of claim 6, wherein the first serving cell is a scheduled serving cell, and the second serving cell is a scheduling serving cell.

14. A network, comprising:
   a control circuit;
   a processor installed in the control circuit; and
   a memory installed in the control circuit and coupled to the processor;
   wherein the processor is configured to execute a program code stored in the memory to:
      configure a first serving cell and a second serving cell to a UE (User Equipment), wherein a first PDCCH (Physical Downlink Control Channel) scheduling a first PDSCH (Physical Downlink Shared Channel) on the first serving cell and a second PDCCH scheduling a second PDSCH on the second serving cell are transmitted on the second serving cell;
      transmit the second PDSCH via a first TCI (Transmission Configuration Indication) state applied for a CORESET (Control Resource Set) of the second serving cell where the second PDCCH is transmitted when a TCI field is not present in a second DCI (Downlink Control Information) of the second PDCCH; and
      transmit the first PDSCH via a second TCI state, wherein the second TCI state comprises the lowest TCI state ID (Identity), when a TCI field is not present in a first DCI of the first PDCCH.

15. The network of claim 14, wherein the CORESET configuration indicates a CORESET transmitted in the second serving cell.

16. The network of claim 14, wherein the first serving cell is a scheduled serving cell, and the second serving cell is a scheduling serving cell.

17. A UE, comprising:
   a control circuit;
   a processor installed in the control circuit; and
   a memory installed in the control circuit and coupled to the processor;
   wherein the processor is configured to execute a program code stored in the memory to:
      receive a configuration of a first serving cell and a second serving cell from a network;
      receive and/or monitor a first PDCCH (Physical Download Control Channel) transmitted on the second serving cell, wherein the first PDCCH schedules a first PDSCH (Physical Downlink Shared Channel) transmitted on the first serving cell;
      receive and/or monitor a second PDCCH transmitted on the second serving cell, wherein the second PDCCH schedules a second PDSCH transmitted on the second serving cell;
      receive the second PDSCH via a first TCI (Transmission Configuration Indication) state applied for a CORESET (Control Resource Set) where the second PDCCH is transmitted when a TCI field is not present in a second DCI of the second PDCCH; and receive the first PDSCH via a second TCI state, wherein the second TCI state comprises the lowest TCI state ID (Identity) in activated TCI states for receiving PDSCH in the first serving cell when a TCI field is not present in a first DCI of the first PDCCH.

* * * * *